(12) United States Patent
Sukegawa et al.

(10) Patent No.: US 12,397,592 B2
(45) Date of Patent: Aug. 26, 2025

(54) TIRE

(71) Applicant: BRIDGESTONE CORPORATION, Tokyo (JP)

(72) Inventors: Shin Sukegawa, Tokyo (JP); Hironori Hoshino, Tokyo (JP); Hirotomo Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/706,844

(22) PCT Filed: Jun. 22, 2022

(86) PCT No.: PCT/JP2022/024946
§ 371 (c)(1),
(2) Date: May 2, 2024

(87) PCT Pub. No.: WO2023/105824
PCT Pub. Date: Jun. 15, 2023

(65) Prior Publication Data
US 2025/0010667 A1    Jan. 9, 2025

(30) Foreign Application Priority Data
Dec. 9, 2021 (JP) ................. 2021-200133

(51) Int. Cl.
*B60C 19/00* (2006.01)
*B60C 13/00* (2006.01)

(52) U.S. Cl.
CPC ............ *B60C 19/00* (2013.01); *B60C 13/001* (2013.01)

(58) Field of Classification Search
CPC . B60C 13/001; B60C 19/00; B60C 2019/004; B60C 23/0493
See application file for complete search history.

(56) References Cited

U.S. PATENT DOCUMENTS

| | | |
|---|---|---|
| 7,112,251 B2 | 9/2006 | Majumdar et al. |
| 8,004,408 B2 | 8/2011 | Shimura |
| 2005/0109440 A1* | 5/2005 | Majumdar ............ B60C 13/001 |
| | | 152/523 |
| 2020/0070597 A1* | 3/2020 | Noel ................... B60C 23/0493 |

FOREIGN PATENT DOCUMENTS

| | | | |
|---|---|---|---|
| DE | 202019101651 U1 * | 5/2019 | |
| DE | 102020205736 A1 | 11/2021 | |
| EP | 3078508 A1 | 10/2016 | |
| EP | 3620312 A1 | 3/2020 | |
| JP | 2003136909 A | 5/2003 | |

(Continued)

OTHER PUBLICATIONS

English machine translation of DE202019101651. (Year: 2019).*

(Continued)

*Primary Examiner* — Robert C Dye
(74) *Attorney, Agent, or Firm* — KENJA IP LAW PC

(57) ABSTRACT

A tire according to the present disclosure includes a tire body and a communication device embedded within the tire body or mounted on an inner surface of the tire body. The tire includes a label area that is located on an outer surface of the tire body and indicates the position of the communication device. The label area includes a light emission area.

8 Claims, 16 Drawing Sheets

(56) References Cited

FOREIGN PATENT DOCUMENTS

| JP | 2004148953 A | 5/2004 |
|---|---|---|
| JP | 2006056443 A | 3/2006 |
| JP | 4487125 B2 | 6/2010 |
| JP | 2016159713 A | 9/2016 |
| JP | 2017128159 A | 7/2017 |
| JP | 2020069941 A | 5/2020 |

OTHER PUBLICATIONS

Aug. 9, 2022, International Search Report issued in the International Patent Application No. PCT/JP2022/024946.

Jun. 5, 2024, International Preliminary Report on Patentability issued in the International Patent Application No. PCT/JP2022/024946.

Feb. 14, 2025, search result of the Extended European Search Report issued by the European Patent Office in the corresponding European Patent Application No. 22903760.1.

Jun. 13, 2025, search result of Office Action issued by the China National Intellectual Property Administration in the corresponding Chinese Patent Application No. 202280076247.4.

\* cited by examiner

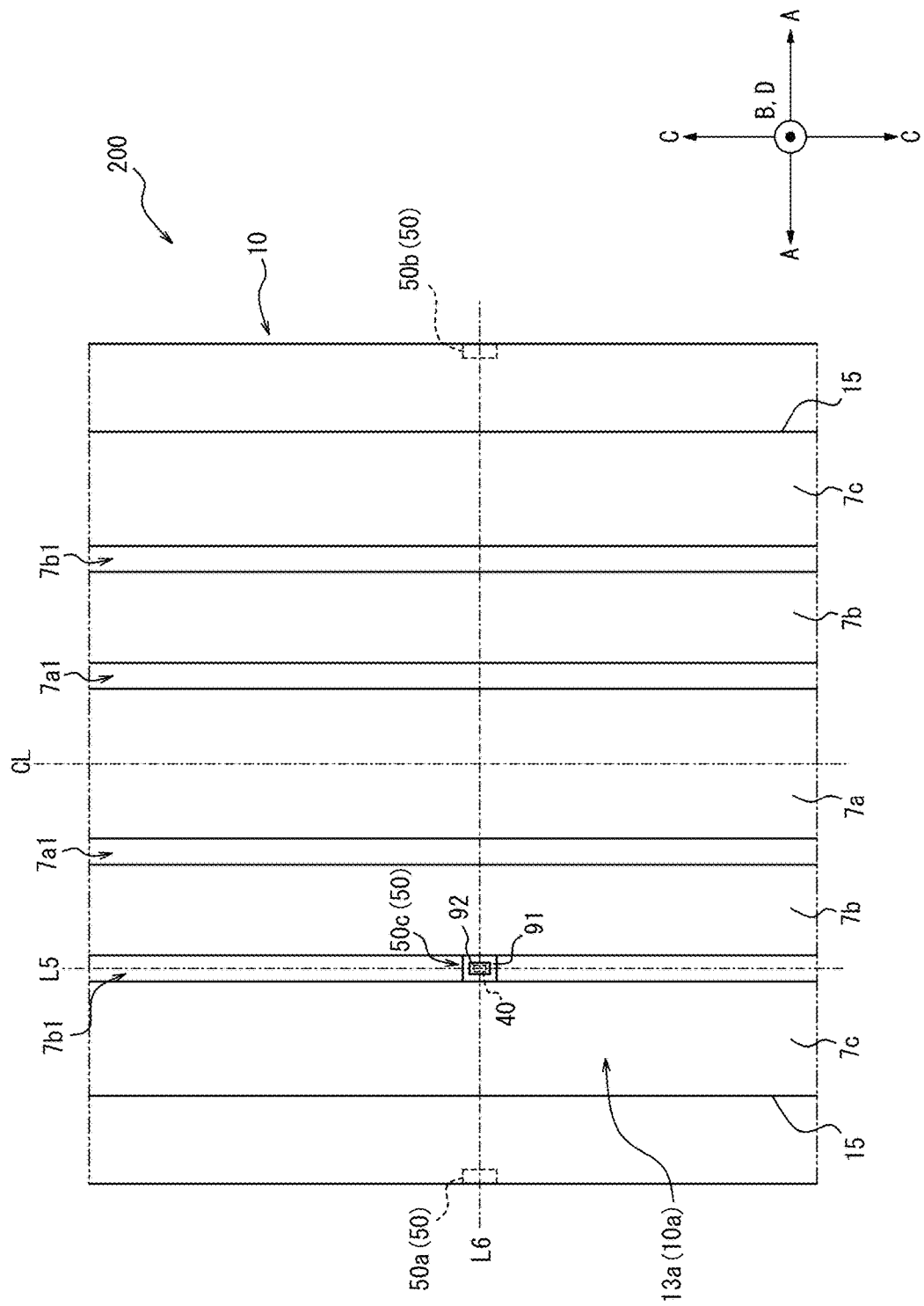

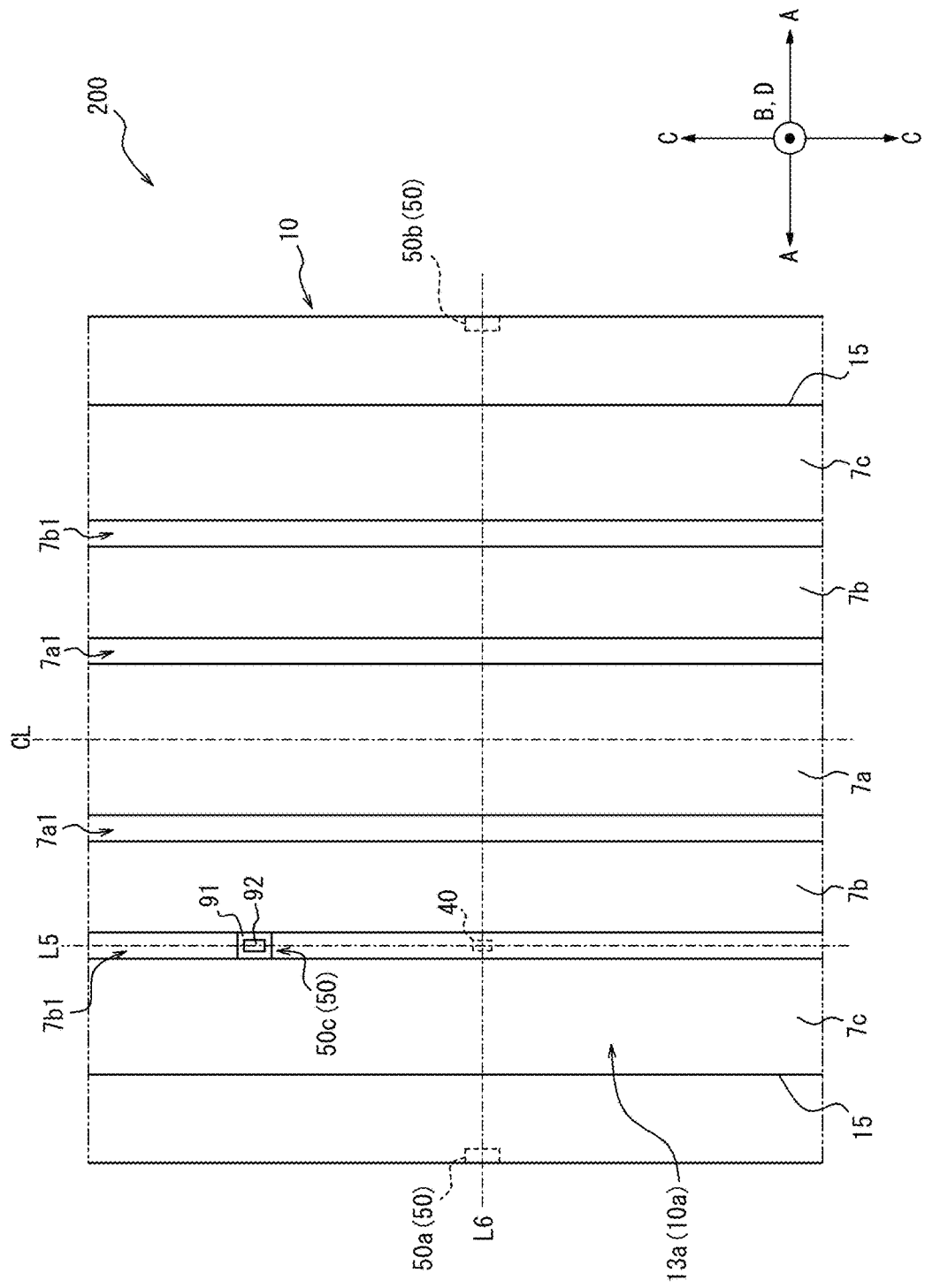

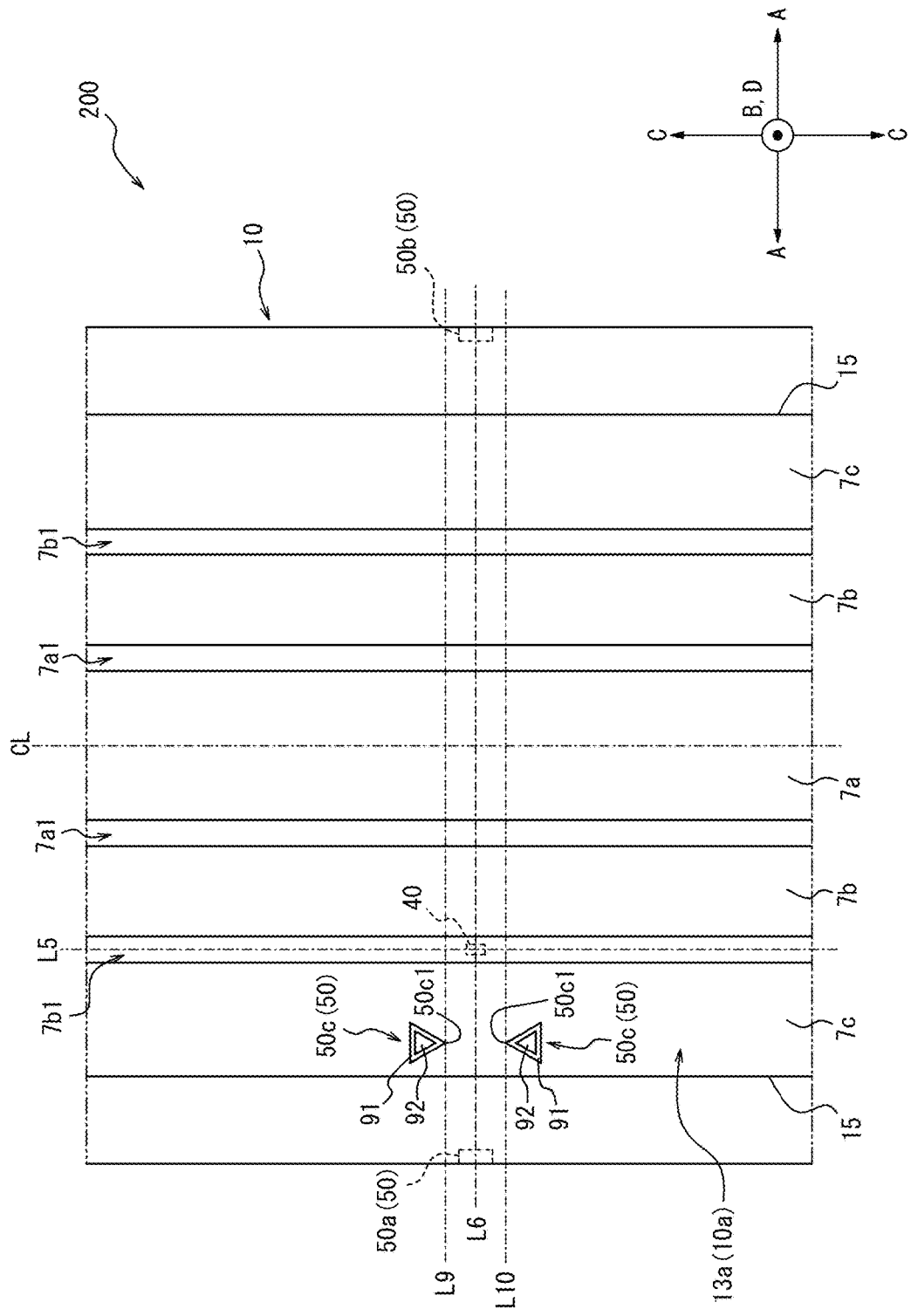

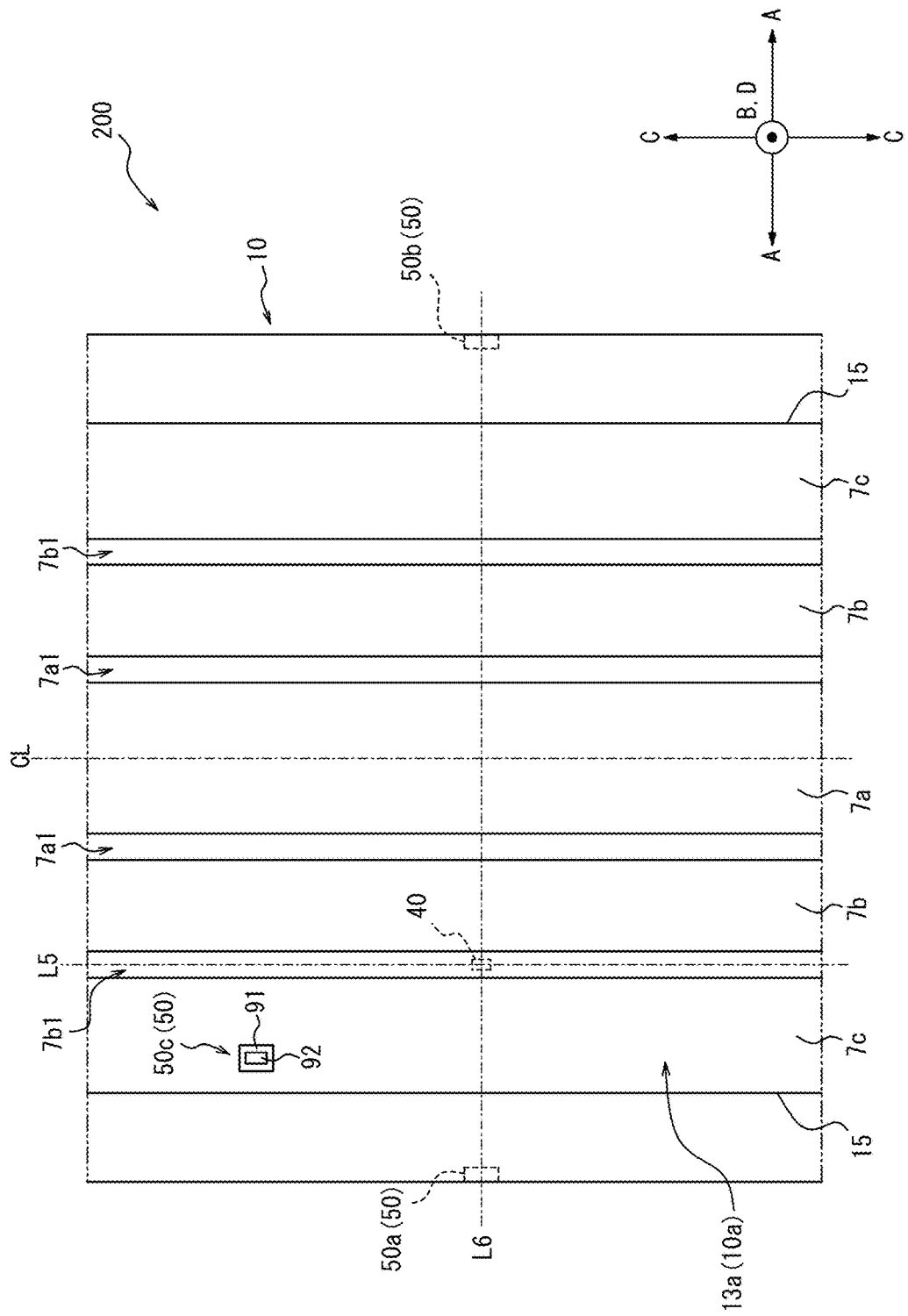

TIRE

TECHNICAL FIELD

The present disclosure relates to a tire.

BACKGROUND

Tires with communication devices such as RF tags embedded within are known. Patent Literature (PTL) 1 discloses this type of tire.

CITATION LIST

Patent Literature

PTL 1: JP 2004-148953 A

SUMMARY

Technical Problem

It is difficult to distinguish the position of a communication device embedded within a tire or mounted on an inner surface of a tire from outside the tire at night or in a dark surrounding environment.

It would be helpful to provide a tire in which the position of a communication device can be distinguished from outside the tire in a dark surrounding environment.

Solution to Problem

A tire, as a first aspect of the present disclosure, includes a tire body and a communication device embedded within the tire body or mounted on an inner surface of the tire body. The tire includes a label area that is located on an outer surface of the tire body and indicates the position of the communication device. The label area includes a light emission area.

Advantageous Effect

According to the present disclosure, it is possible to provide a tire in which the position of a communication device can be distinguished from outside the tire in a dark surrounding environment.

BRIEF DESCRIPTION OF THE DRAWINGS

In the accompanying drawings:

FIG. 7 is a part of a development diagram of a tread outer surface of the tire illustrated in FIG. 6;

FIG. 8A is a diagram illustrating a variation of a third label area illustrated in FIG. 6;

FIG. 8D is a diagram illustrating a variation of the third label area illustrated in FIG. 6; and FIG. 8E is a diagram illustrating a variation of the third label area illustrated in FIG. 6.

DETAILED DESCRIPTION

Figure 1:
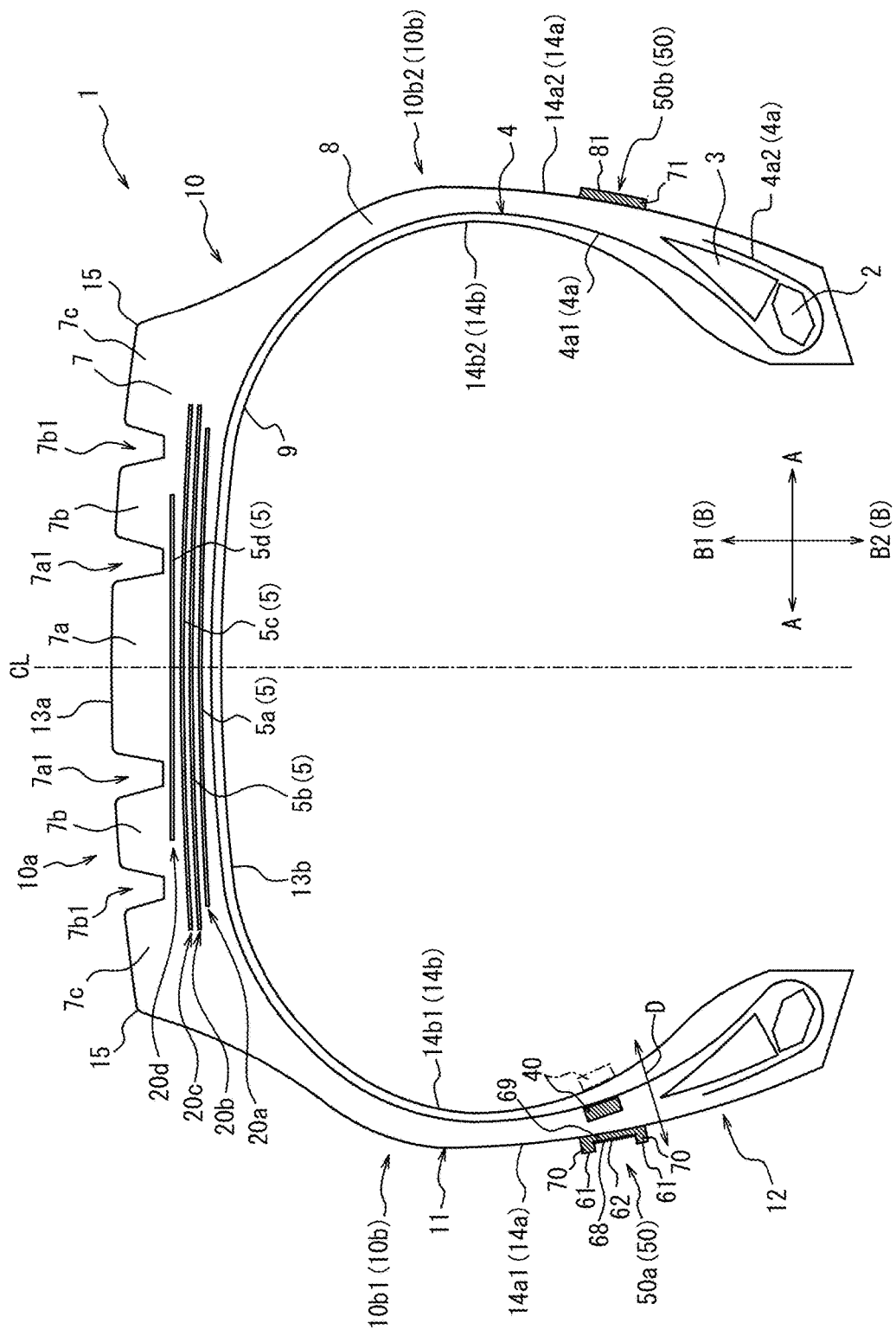
FIG. 1 is a cross-sectional view of a tire as an embodiment of the present disclosure in a tire width direction.

Embodiments of a tire according to the present disclosure will be exemplarily described below with reference to the drawings. In the drawings, the same reference signs denote common components. In this specification, a tire width direction refers to a direction parallel to the central axis of the tire. A tire radial direction refers to a radial direction that is orthogonal to the central axis of the tire and centered on the central axis. A tire circumferential direction refers to a direction in which the tire rotates about the central axis of the tire.

In this specification, a "tread outer surface" means an outer circumferential surface throughout the entire circumference of the tire that is in contact with a road surface when the tire mounted on a rim and filled with a specified internal pressure is rotated under a maximum load (hereinafter also referred to as "maximum load condition"). In addition, "tread ends" mean outer ends of the tread outer surface in the tire width direction.

In this specification, the "rim" means a standard rim (Measuring Rim in ETRTO's STANDARDS MANUAL and Design Rim in TRA's YEAR BOOK) of an applicable size conformable to industrial standards valid for regions in which tires are produced and used, as described in or to be described in JATMA YEAR BOOK of the Japan Automobile Tyre Manufacturers Association, Inc. (JATMA) in Japan, STANDARDS MANUAL of the European Tyre and Rim Technical Organisation (ETRTO) in Europe, YEAR BOOK of the Tire and Rim Association, Inc. (TRA) in the United States, or the like, but in the case of a size that is not listed in such industrial standards, a rim with a width corresponding to a bead width of the tire. The "rim" may be of a size that may be included in the above industrial standards in the future, as well as a current size. Examples of the "size that is included in the future" may be sizes listed as "FUTURE DEVELOPMENTS" in the 2013 edition of STANDARDS MANUAL of the ETRTO.

In this specification, the "specified internal pressure" means an air pressure (maximum air pressure) corresponding to a maximum load capacity of a single wheel in an applicable size and ply rating as described in the above industrial standards such as JATMA YEAR BOOK, but in the case of a size that is not listed in the above industry standards, an air pressure (maximum air pressure) corresponding to a maximum load capacity specified for each vehicle on which the tire is mounted. In this specification, the "maximum load" means a load corresponding to the maximum load capacity of the tire of an applicable size listed in the above industrial standards, but in the case of a size that is not listed in the above industrial standards, a load corresponding to the maximum load capacity specified for each vehicle on which the tire is mounted.

FIRST EMBODIMENT

A pneumatic tire 1 (hereinafter simply referred to as "tire 1") as an embodiment of the tire according to the present disclosure will be exemplarily described below with reference to the drawings. Unless otherwise stated, the tire 1 described below is assumed to mean a tire 1 that is mounted on a rim, filled with a specified internal pressure, and in a maximum load condition. The type of tire 1 is not particularly limited, and may be, for example, a tire for trucks or buses, or a tire for passenger cars.

FIG. 1 is a cross-sectional view of the tire 1 in a tire width direction. As illustrated in FIG. 1, the tire 1 includes a tire body 10 and a communication device 40.

The tire body 10 includes a tread portion 10a, a first side portion 10b1, and a second side portion 10b2. The first side portion 10b1 extends from one end of the tread portion 10a in a tire width direction A toward an inner side B2 in a tire radial direction B. The second side portion 10b2 extends from the other end of the tread portion 10a in the tire width direction A toward the inner side B2 in the tire radial direction B. Hereinafter, the first side portion 10b1 and the second side portion 10b2 are simply described as "side portions 10b" when not specifically distinguished.

The side portions 10b each have a sidewall portion 11 and a bead portion 12. The sidewall portion 11 is connected to the end of the tread portion 10a in the tire width direction A and extends toward the inner side B2 in the tire radial direction B. The bead portion 12 is connected to an end of the sidewall portion 11 on the inner side B2 in the tire radial direction B.

More specifically, the tire body 10 of this embodiment includes bead cores 2, bead fillers 3, a carcass 4, belts 5, tread rubber 7, side rubber 8, and an inner liner 9. However, the tire body 10 may include other components, not limited to the above components.

[Tire Body 10]

[[Bead Cores 2 and Bead Fillers 3]]

The bead cores 2 and the bead fillers 3 are embedded in the bead portions 12 of the side portions 10b. Each bead core 2 includes a bead cord that is surrounded by a rubber coating. The bead cord is formed of a steel cord. Each bead filler 3 is made of rubber and is located on an outer side B1 in the tire radial direction B with respect to the bead core 2.

[[Carcass 4]]

The carcass 4 extends toroidally between the pair of bead portions 12, which is constituted of the bead portion 12 of the first side portion 10b1 and the bead portion 12 of the second side portion 10b2, more specifically between the pair of bead cores 2. Specifically, the carcass 4 of this embodiment includes a carcass ply 4a. The carcass ply 4a is folded from the inside to the outside in the tire width direction A around the respective bead cores 2. The carcass ply 4a may have a plurality of ply cords arranged parallel to each other and coating rubber that coats the plurality of ply cords. The carcass 4 of this embodiment includes only one carcass ply 4a, but may include two or more carcass plies 4a. The plurality of ply cords of the carcass ply 4a may be arranged at an angle of, for example, 75° to 90° with respect to a tire circumferential direction C. The ply cords of the carcass ply 4a can be, for example, metal cords such as steel cords.

More specifically, the carcass ply 4a of this embodiment has a body part 4a1 located between the pair of bead cores 2, and folded parts 4a2 that are connected to the body part 4a1 and folded from the inside to the outside in the tire width direction A around the respective bead cores 2. The above-described bead fillers 3 are each located between the body part 4a1 and each folded part 4a2 of the carcass ply 4a.

[[Belts 5]]

The belts 5 are embedded in the tread portion 10a. The tire body 10 of this embodiment has four of the belts 5 on the outer side B1 of a crown part of the carcass 4 in the tire radial direction B. The four belts 5 of this embodiment include a first belt 5a, a second belt 5b, a third belt 5c, and a fourth belt 5d. Hereafter, the first belt 5a, the second belt 5b, the third belt 5c, and the fourth belt 5d are simply referred to as "belts 5" when not specifically distinguished. The first belt 5a is located at the most inner side B2 in the tire radial direction B, among the first belt 5a, the second belt 5b, the third belt 5c, and the fourth belt 5d. The fourth belt 5d is located at the most outer side B1 in the tire radial direction B, among the first belt 5a, the second belt 5b, the third belt 5c, and the fourth belt 5d. The second belt 5b and the third belt 5c are located between the first belt 5a and the fourth belt 5d in the tire radial direction B. More specifically, the third belt 5c is located on the outer side B1 of the second belt 5b in the tire radial direction B.

In this embodiment, the first belt 5a, the second belt 5b, the third belt 5c, and the fourth belt 5d constitute four belt layers. Specifically, the first belt 5a forms a first belt layer 20a located at the most inner side B2 in the tire radial direction B. The fourth belt 5d forms a fourth belt layer 20d located at the most outer side B1 in the tire radial direction B. The second belt 5b forms a second belt layer 20b. The third belt 5c forms a third belt layer 20c.

Each belt 5 may include a plurality of belt cords arranged in parallel to each other and coating rubber that coats the plurality of belt cords. The first to fourth belt layers 20a to 20d are inclined belt layers in which the belt cords form a predetermined angle with respect to the tire circumferential direction C. The belt cords of two belt layers adjacent in the tire radial direction B, among the first to fourth belt layers 20a to 20d, may be inclined in the same direction or in opposite directions with respect to the tire circumferential direction C. The material of the belt cords of the belts 5 is not particularly limited.

The belt cords of the belts 5 may be, for example, metal cords or organic fiber cords. A rubber composition used for the coating rubber of the belts 5 is not particularly limited.

[[Tread Rubber 7]]

As illustrated in FIG. 1, the tread rubber 7 is located on the outer side B1 of the crown part of the body part 4a1 of the carcass ply 4a and on the outer side B1 of the first to fourth belts 5a to 5d, which constitute the first to fourth belt layers 20a to 20d, in the tire radial direction B. A tread outer surface 13a, which is an outer surface of the tread portion 10a of this embodiment, is composed of the tread rubber 7. In the tread outer surface 13a, as illustrated in FIG. 1, there are formed two inner circumferential grooves 7a1, which zone a center land area 7a through which a tire equatorial plane CL passes, and two outer circumferential grooves 7b1, which are located outside the inner circumferential grooves 7a1 in the tire width direction A and zone intermediate land areas 7b each between the inner circumferential groove 7a1 and the outer circumferential groove 7b1. In the tread outer surface 13a of this embodiment, shoulder land areas 7c are zoned each between the outer circumferential groove 7b1 and a tread end 15 located outside the outer circumferential groove 7b1 in the tire width direction A. In the tread outer surface 13*a*, for example, width directional grooves extending in the tire width direction A or the like may be formed.

[[Side Rubber 8]]

The side rubber 8 is disposed outside the body part 4*a*1 and the folded parts 4*a*2 of the carcass ply 4*a* in the tire width direction A. Side outer surfaces 14*a*, which are outer surfaces of the side portions 10*b* of this embodiment, are composed of the side rubber 8. Ends of the side rubber 8 on the outer side B1 in the tire radial direction B are connected to ends of the above-described tread rubber 7 in the tire width direction A.

Thus, in this embodiment, an outer surface of the tire body 10 includes the tread outer surface 13*a* and the side outer surfaces 14*a*, which are connected to the tread outer surface 13*a*. The tire body 10 includes, on its outer surface, label areas 50 that indicate the position of a communication device 40 described below. The details of the distinction areas 50 will be described below (see FIGS. 2, 3, and the like).

[[Inner Liner 9]]

The inner liner 9 covers a tire inner surface side of the body part 4*a*1 of the carcass ply 4*a*, and constitutes an inner surface of the tire body 10. The inner surface of the tire body 10 includes a tread inner surface 13*b*, which is an inner surface of the tread portion 10*a*, and side inner surfaces 14*b*, which are inner surfaces of the side portions 10*b*. The inner liner 9 is laminated on the tire inner surface side of the body part 4*a*1 of the carcass ply 4*a*. The inner liner 9 may be formed of, for example, butyl rubber with low air permeability.

[Communication Device 40]

As illustrated in FIG. 1, the communication device 40 is embedded within the tire body 10. However, the communication device 40 may be mounted on the inner surface of the tire body 10. The inner surface of the tire body 10 on which the communication device 40 is mounted may be the tread inner surface 13*b*, a first side inner surface 14*b*1, which is an inner surface of the first side portion 10*b*1, or a second side inner surface 14*b*2, which is an inner surface of the second side portion 10*b*2.

As illustrated in FIG. 1, the communication device 40 of this embodiment is embedded within the side portion 10*b* of the tire body 10. More specifically, the communication device 40 of this embodiment is embedded within the first side portion 10*b*1 of the tire body 10. The communication device 40 of this embodiment is embedded, in the first side portion 10*b*1, between the body part 4*a*1 of the carcass 4 and the side rubber 8. However, the communication device 40 may be embedded in another location in the first side portion 10*b*1. As described above, the communication device 40 may also be mounted on the inner surface of the first side portion 10*b*1 (see the position represented by the alternate long and short dashed line with the reference sign "40" in FIG. 1).

Furthermore, the communication device 40 may be disposed in another location than the first side portion 10*b*1. The communication device 40 may be, for example, embedded within the second side portion 10*b*2 of the tire body 10, or mounted on the inner surface of the second side portion 10*b*2. The communication device 40 may be embedded within the tread portion 10*a* of the tire body 10 (see FIG. 5), or may be mounted on the inner surface of the tread portion 10*a* (see FIG. 6).

The configuration of the communication device 40 is not particularly limited as long as the communication device 40 is configured to be able to wirelessly communicate with a predetermined device outside the tire body 10. An example of the communication device 40 is an RF tag. The RF tag, as the communication device 40, can wirelessly communicate with a reader/writer located outside the tire body 10. The RF tag may be, for example, a passive RF tag that is operated by electric power supplied from the reader/writer located outside the tire body 10. Specifically, the RF tag, as the communication device 40, can receive, at an antenna of the RF tag, information transmitted from an antenna of the reader/writer in the form of a radio wave or a magnetic field. Due to rectification (in the case of the radio wave) or resonance (in the case of the magnetic field), electric power is generated at the antenna of the RF tag, and a memory and a controller of the RF tag perform predetermined operations. The controller of the RF tag can, for example, read out information from the memory of the RF tag and transmit the information (back) to the reader/writer from the antenna in the form of a radio wave or a magnetic field. The antenna of the reader/writer receives the radio wave or the magnetic field from the RF tag. A controller of the reader/writer retrieves the received information to acquire the information stored in the memory of the RF tag. The above-described memory and controller of the RF tag may be configured, for example, in an integrated circuit (IC chip) including a non-volatile memory.

The communication device 40 may be embedded within the tire body 10, for example, as a covered communication device whose periphery is covered in advance with covering rubber. In such a case, the covering rubber that covers the periphery of the communication device 40 may be colored differently from adjacent portions of the tire body 10.

[[[Label Areas 50 on Outer Surfaces of Tire Body 10]]]

As illustrated in FIG. 1, the label areas 50 indicating the position of the communication device 40 are provided on the outer surfaces of the tire body 10. The label areas 50 of this embodiment are provided on the side outer surfaces 14*a*, which are the outer surfaces of the side portions 10*b* of the tire body 10. More specifically, the tire body 10 of this embodiment includes a first label area 50*a* provided on a first side outer surface 14*a*1, which is an outer surface of the first side portion 10*b*1, and a second label area 50*b* provided on a second side outer surface 14*a*2, which is an outer surface of the second side portion 10*b*2.

Figure 2:
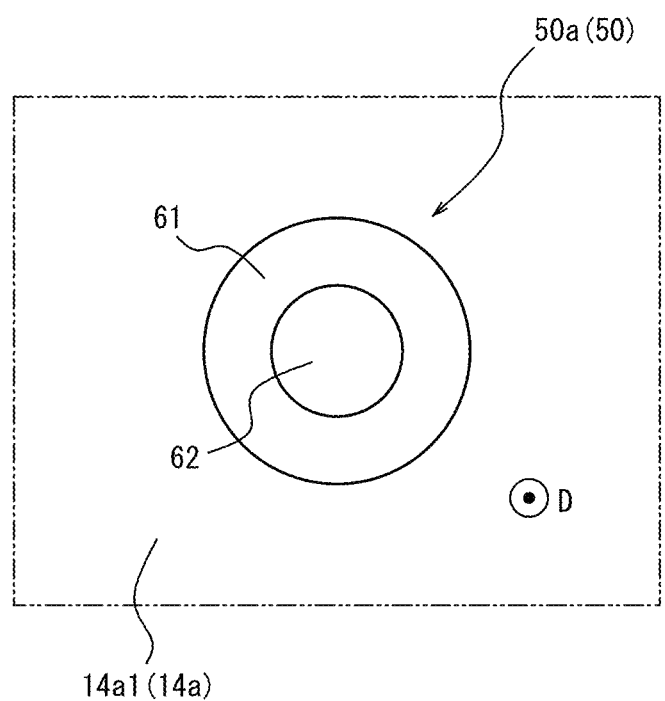
FIG. 2 is a front view of a first label area of the tire illustrated in FIG. 1.
Figure 3:
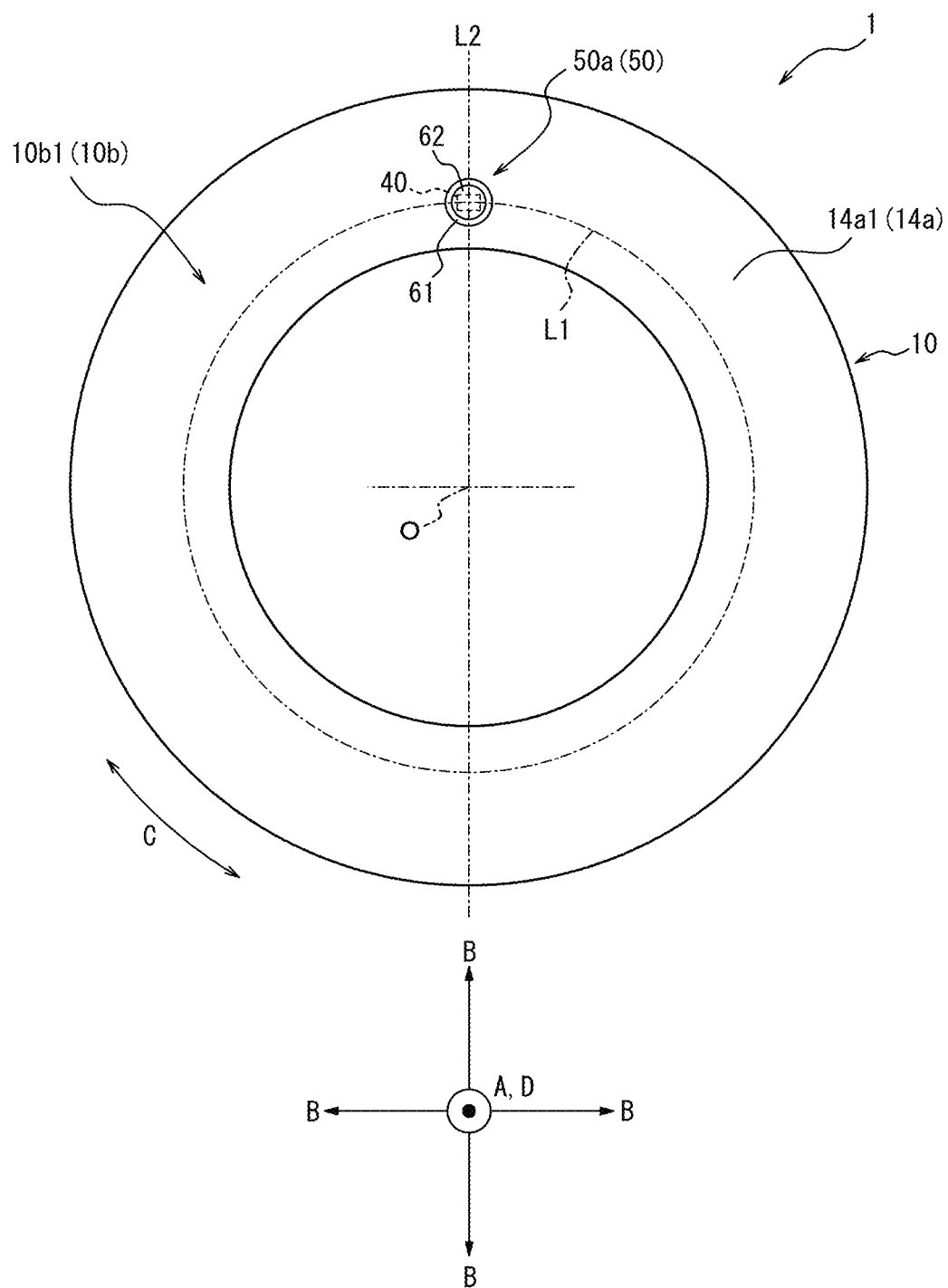
FIG. 3 is a side view of the tire illustrated in FIG. 1, viewed from the side of a first side portion.

FIGS. 2 and 3 are diagrams illustrating the first label area 50*a* from the front. In particular, FIG. 3 is a side view of the tire 1 viewed from the side of the first side portion 10*b*1. In FIG. 3, the position of the communication device 40 is represented by a dashed line.

As illustrated in FIG. 3, in this embodiment, the first label area 50*a* and the communication device 40 are disposed at the same position in the tire radial direction B. Here, "the first label area 50*a* and the communication device 40 are disposed at the same position in the tire radial direction B" means that there is at least one virtual circle L1 around the central axis O of the tire 1 that passes through the first label area 50*a* and the communication device 40 in the side view of the tire 1 (see FIG. 3). In other words, it is not limited to a case in which the extension areas of the respective first label area 50*a* and communication device 40 in the tire radial direction B are completely coincident.

As illustrated in FIG. 3, in this embodiment, the first label area 50*a* and the communication device 40 are disposed at the same position in the tire circumferential direction C. Here, "the first label area 50*a* and the communication device 40 are disposed at the same position in the tire circumferential direction C" means that, in the side view of the tire 1 (see FIG. 3), there is at least one virtual straight line L2 that passes through the central axis O of the tire 1 and passes through the first label area 50*a* and the communication device 40 on one side with respect to the central axis O. In other words, it is not limited to a case in which the extension areas of the respective first label area 50*a* and communication device 40 in the tire circumferential direction C are completely coincident.

In other words, the first label area 50*a* and the communication device 40 of this embodiment overlap in a tire wall thickness direction D. The communication device 40 of this embodiment overlaps with the first label area 50*a* in the tire wall thickness direction D in its entire extension areas in the tire radial direction B and the tire circumferential direction C. In other words, the entire communication device 40 of this embodiment overlaps with the first label area 50*a* in the tire wall thickness direction D. However, only a part of the communication device 40 may overlap with the first label area 50*a* in the tire wall thickness direction D. The entire first label area 50*a* may overlap with the communication device 40 in the tire wall thickness direction D. Furthermore, the contour of the first label area 50*a* may coincide with the contour of the communication device 40 in the tire wall thickness direction D. In other words, the entire first label area 50*a* may overlap with the entire communication device 40 in the tire wall thickness direction D.

Thus, the first label area 50*a* of this embodiment is disposed in such a position that at least a part of the first label area 50*a* overlaps with the communication device 40 in the tire wall thickness direction D. Therefore, the position of the communication device 40 can be identified by identifying the first label area 50*a* from outside the tire 1.

As illustrated in FIGS. 1 to 3, the first label area 50*a* of this embodiment includes a light emission area 61. The light emission area 61 may be, for example, a phosphorescent area that emits stored light. The provision of the light emission area 61 in the first label area 50*a* allows the first label area 50*a* to be easily identified from outside the tire 1 in a dark environment, such as at night or in a dark place. Therefore, the position of the communication device 40 can be easily identified in the dark environment.

The light emission area 61 of the first label area 50*a* is not particularly limited as long as the light emission area 61 is an area that emits light to the outside. The light emission area 61 may be composed of, for example, phosphorescent paint containing a phosphorescent material. The light emission area 61 may be formed, for example, by mixing a phosphorescent material into a part of a rubber composition configuring the outer surface of the tire body 10. The rubber composition containing the phosphorescent material may be, for example, affixed to an unvulcanized tire and vulcanized together with the unvulcanized tire. The rubber composition containing the phosphorescent material may also be, for example, affixed to a tire after vulcanization. Furthermore, the light emission area 61 may be formed, for example, by a resin phosphorescent material configuring a part of the outer surface of the tire. The resin phosphorescent material may be formed, for example, by carrying a phosphorescent material in void spaces of a foam resin, such as polyurethane foam. The resin phosphorescent material may be, for example, affixed to an unvulcanized tire and vulcanized together with the unvulcanized tire. The resin phosphorescent material may also be, for example, affixed to a tire after vulcanization.

The phosphorescent material is not particularly limited, and any known phosphorescent material may be used. Examples of the phosphorescent material include, for example, compositions: SrAl2O4: Eu, Dy; Sr4Al14O25: Eu, Dy; SrAl2O4: Eu, Dy+Sr4Al14O25: Eu, Dy; Sr4Al14O25: Eu, Dy+CaAl2O4: Eu, Nd; CaAl2O4: Eu, Nd; ZnS: Cu, Mn, Co; ZnS: Cu; and the like.

The light emission area 61 of the first label area 50*a* preferably has a color or shape that can be distinguished from the surroundings. As illustrated in FIG. 1, the light emission area 61 of this embodiment is provided on a top surface of a convex portion 70, which protrudes outward in the tire width direction A from the surroundings. Thus, the light emission area 61 has a color or shape that can be distinguished from the surroundings, so that the first label area 50*a* can be easily identified not only in a dark environment but also in a bright environment, for example, during the daytime. In other words, the position of the communication device 40 can be distinguished from outside the tire 1 even in the bright environment.

The light emission area 61 of this embodiment is provided on the top surface of the convex portion 70, but is not limited to this configuration. The light emission area 61 may be provided, for example, on a bottom surface of a concave portion. In addition to or instead of being provided on the top surface of the convex portion 70 or the bottom surface of the concave portion, for example, the light emission area 61 may have a different color from the surroundings. Here, the "different color" means not only a difference in at least one of hue, brightness, or saturation, but also a difference in pattern, luster, or the like, such that the difference can be visually grasped. The coloring of the light emission area 61 can be achieved, for example, by adding pigment together with the phosphorescent material described above, or by using pigment containing the phosphorescent material described above. However, as in the present embodiment, the light emission area 61 is preferably provided at least on the top surface of the convex portion 70. This prevents a reduction in the visibility of the light emission area 61 from the outside, for example, in a case in which the light emission area 61 is covered with mud or the like and is difficult to see from the outside. The light emission area 61 provided on the top surface of the convex portion 70 may be composed of, for example, phosphorescent paint laminated on the top surface of the convex portion 70. The light emission area 61 provided on the top surface of the convex portion 70 may be realized, for example, by making the convex portion 70 itself of the rubber composition containing the phosphorescent material, the resin phosphorescent material, or the like as described above.

As illustrated in FIG. 2, the first label area 50*a* of this embodiment preferably includes a non-light emission area 62 surrounded by the light emission area 61. The provision of such a non-light emission area 62 emphasizes the contrast between the light emission area 61 and the non-light emission area 62 in a dark environment. Therefore, the visibility of the first label area 50*a* in the dark environment can be enhanced.

In this embodiment, the entire circumference of the non-light emission area 62 is surrounded by the light emission area 61 in the front view of the first label area 50*a* (see FIGS. 2 and 3). More specifically, the light emission area 61 of the first label area 50*a* of this embodiment is annular in shape in the front view of the first label area 50*a* (see FIGS. 2 and 3). In other words, the convex portion 70 of this embodiment is annular in shape in the front view of the first label area 50*a* (see FIGS. 2 and 3), and the light emission area 61 is provided on the top surface of this annular convex portion 70. The non-light emission area 62 is provided inside the annular light emission area 61 in the front view of the first label area 50*a* (see FIGS. 2 and 3). However, the configuration of the light emission area 61 and the non-light emission area 62 of the first label area 50*a* is not limited to this. As long as the non-light emission area 62 of the first label area 50*a* can be identified in a dark environment, there may be a position at which no light emission area 61 is provided around the non-light emission area 62. Such an aspect includes, for example, a non-light emission area 62 surrounded by an approximately C-shaped light emission area 61 in the front view of the first label area 50*a* (see FIGS. 2 and 3). However, as in this embodiment, the entire circumference of the non-light emission area 62 is preferably surrounded by the light emission area 61 in the front view of the first label area 50*a* (see FIGS. 2 and 3). This can further emphasize the contrast between the light emission area 61 and the non-light emission area 62 in a dark environment.

Furthermore, in this embodiment, only the non-light emission area 62 of the first label area 50*a* is configured to overlap with the communication device 40 in the tire wall thickness direction D. In other words, the light emission area 61 of the first label area 50*a* is configured not to overlap with the communication device 40 in the tire wall thickness direction D. Thereby, the position outside the contour (see the dashed line in FIG. 3) of the communication device 40 can be identified by the light emission area 61 in the front view of the first label area 50*a* (see FIGS. 2 and 3). Therefore, the entire communication device 40 can be easily removed from the tire body 10 by using the first label area 50*a*, for example, at the time of disposal of the tire 1.

The non-light emission area 62 may have a different color from the light emission area 61. The non-light emission area 62 may have a different color from the color of the first side outer surface 14*a*1 of the first side portion 10*b*1 located around the first label area 50*a*. This can enhance the distinguishability of each of the light emission area 61, the non-light emission area 62, and the surroundings of the first label area 50*a* in a bright environment.

The non-light emission area 62 of a different color from the light emission area 61 may be configured, for example, by paint containing pigment. The non-light emission area 62 of a different color from the light emission area 61 may be formed, for example, by coloring the non-light emission area 62 with a mixture of other pigment than carbon black into a part of the rubber composition composing the outer surface of the tire body 10. Such a colored rubber composition may be, for example, affixed to an unvulcanized tire and vulcanized together with the unvulcanized tire. The colored rubber composition may also be affixed to a tire after vulcanization, for example. Furthermore, the non-light emission area 62 of a different color from the light emission area 61 may be formed of, for example, a resin coloring body that constitutes a part of the outer surface of the tire. The resin coloring body may be formed, for example, by carrying pigment in void spaces of a foam resin, such as polyurethane foam. The resin coloring body may be, for example, affixed to an unvulcanized tire and vulcanized together with the unvulcanized tire. The resin coloring body may also be affixed to a tire after vulcanization, for example.

As illustrated in FIG. 1, the non-light emission area 62 may be provided on a fine uneven surface. The fine uneven surface may have, for example, a base surface and a plurality of ridges 68 with a height of 0.1 to 1.0 mm that is arranged in parallel on the base surface. The distance between the tops of two adjacent ridges 68 is preferably 0.3 to 1.5 mm, for example. The provision of the non-light emission area 62 on such a fine uneven surface can control the reflection of light from the non-light emission area 62 in a bright environment, and therefore can achieve a high contrast with the surrounding light emission area 61, which reflects light. Therefore, the distinguishability of each of the light emission area 61 and the non-light emission area 62 can be further enhanced in the bright environment.

The tire body 10 of this embodiment includes a cylindrical base protrusion portion 69, which protrudes on the outer surface of the first side portion 10*b*1, and the annular convex portion 70, which protrudes from an outer edge of a top surface of the base protrusion portion 69. The first label area 50*a* of this embodiment is constituted of the light emission area 61, which is provided on the top surface of the convex portion 70, and the non-light emission area 62, which is provided on the top surface of the base protrusion portion 69 inside the convex portion 70. In other words, in this embodiment, not only the light emission area 61 but also the non-light emission area 62 is provided on the top surface of the portion protruding from the surroundings of the first label area 50*a*. By providing the entire first label area 50*a* on the top surface of the portion protruding on the outer surface of the tire body 10, as described above, the distinguishability of the first label area 50*a* can be further enhanced.

Such a first label area 50*a* can be achieved, for example, by laminating paint containing a phosphorescent material on the top surface of the convex portion 70 and laminating paint containing pigment on the top surface of the base protrusion portion 69 inside the convex portion 70. A component corresponding to the base protrusion portion 69 and a component corresponding to the convex portion 70 may be formed separately and then laminated to form a single unit. The component corresponding to the base protrusion portion 69 may be formed of, for example, the above-described colored rubber composition, resin colored material, or the like. The component corresponding to the convex portion 70 may be formed of, for example, the above-described rubber composition containing the phosphorescent material, the resin phosphorescent material, or the like.

As illustrated in FIG. 1, in this embodiment, the second label area 50*b* is provided on the second side outer surface 14*a*2 of the second side portion 10*b*2 of the tire body 10. The second label area 50*b* is configured to be distinguishable from the first label area 50*a*. Specifically, the second label area 50*b* of this embodiment is constituted only of a light emission area 81. In other words, the second label area 50*b* of this embodiment is the light emission area 81 in the entirety of its contour in the front view, and does not include a non-light emission area. By making the first label area 50*a* and the second label area 50*b* distinguishable, as described above, it is possible to prevent confusion between the first label area 50*a* and the second label area 50*b* and to distinguish between information indicated by the first label area 50*a* and information indicated by the second label area 50*b*.

In this embodiment, the information indicated by the first label area 50*a* is the position itself of the communication device 40 overlapping in the tire wall thickness direction D. On the contrary, the information indicated by the second label area 50*b* is the position of the communication device 40 in the tire circumferential direction C. The second label area 50*b* and the communication device 40 of this embodiment are disposed at the same position in the tire circumferential direction C. Here, "the second label area 50*b* and the communication device 40 are disposed at the same position in the tire circumferential direction C" is the same as the relationship described above in which the first label area 50*a* and the communication device 40 are disposed at the same position in the tire circumferential direction C. In other words, the second label area 50*b* of this embodiment indicates only the position of the communication device 40 in the tire circumferential direction C. The provision of the second label area 50b, in addition to the first label area 50a, allows the position of the communication device 40 in the tire circumferential direction C to be identified even from the side of the second side portion 10b2, in contrast to the case of providing only the first label area 50a. Therefore, for example, even when the tire 1 is mounted on a vehicle with the first side portion 10b1 located inside the vehicle, and the first label area 50a is not visible from outside the vehicle, the position of the communication device 40 can be narrowed down based on the second label area 50b on the second side portion 10b2. The position of the communication device 40 can be easily identified regardless of the orientation of the first side portion 10b1 of the tire body 10 mounted on the vehicle.

The second label area 50b of this embodiment indicates the position of the communication device 40 in the tire circumferential direction C, but is not limited to this configuration. The second label area 50b may indicate the position of the communication device 40 in the tire radial direction B. In other words, the second label area 50b and the communication device 40 may be disposed at the same position in the tire radial direction B. Here, "the second label area 50b and the communication device 40 are disposed at the same position in the tire radial direction B" is the same as the relationship described above in which the first label area 50a and the communication device 40 are disposed at the same position in the tire radial direction B. The second label area 50b may not indicate the position of the communication device 40 in the tire radial direction B and the tire circumferential direction C, but only indicate that the communication device 40 is in/on the first side portion 10b1. In other words, the second label area 50b may be a label indicating that there is no communication device 40 in/on the second side portion 10b2. Thus, the second label area 50b is not particularly limited as long as the second label area 50b indicates some location information on the communication device 40. However, as described above, it is preferable that the second label area 50b indicates at least the position of the communication device 40 in the tire circumferential direction C.

The light emission area 81 of the second label area 50b preferably has a color or shape that can be distinguished from the surroundings. As illustrated in FIG. 1, the light emission area 81 of this embodiment is provided on a top surface of a convex portion 71, which protrudes outward in the tire width direction A from the surroundings. Thus, due to the light emission area 81 having the color or the shape that can be distinguished from the surroundings, the second label area 50b can be easily identified not only in a dark environment but also in a bright environment, for example, during the daytime.

The light emission area 81 of this embodiment is provided on the top surface of the convex portion 71, but is not limited to this configuration. The light emission area 81 may be provided, for example, on a bottom surface of a concave portion. In addition to or instead of being provided on the top surface of the convex portion 71 or the bottom surface of the concave portion, for example, the light emission area 81 may have a different color from its surroundings. However, as in the present embodiment, the light emission area 81 is preferably provided at least on the top surface of the convex portion 71. This prevents a reduction in the visibility of the light emission area 81 from the outside, for example, in a case in which the light emission area 81 is covered with mud or the like and is difficult to see from the outside. The light emission area 81 may be formed of, for example, paint containing a phosphorescent material, or the like, by the same method as for the light emission area 61 of the first label area 50a as described above.

The light emission area 81 of the second label area 50b of this embodiment is provided on the entire top surface of the cylindrical convex portion 71, but the aspect thereof is not particularly limited as long as the light emission area 81 can be distinguished from the light emission area 61 of the first label area 50a in a dark environment. The second label area 50b is configured by the top surface of the cylindrical convex portion 71, but the aspect thereof is not particularly limited as long as the second label area 50b can be distinguished from the first label area 50a in a bright environment. The aspect of the second label area 50b is not particularly limited as long as the second label area 50b can be distinguished from the first label area 50a in the dark and bright environments.

Next, with reference to FIGS. 4A to 4E, variations of the first label area 50a will be described. FIGS. 4A to 4E are side views of the tire 1 viewed from the side of the first side portion 10b1. In FIGS. 4A to 4E, the position of the communication device 40 embedded in the first side portion 10b1 is represented by a dashed line.

Figure 4A:
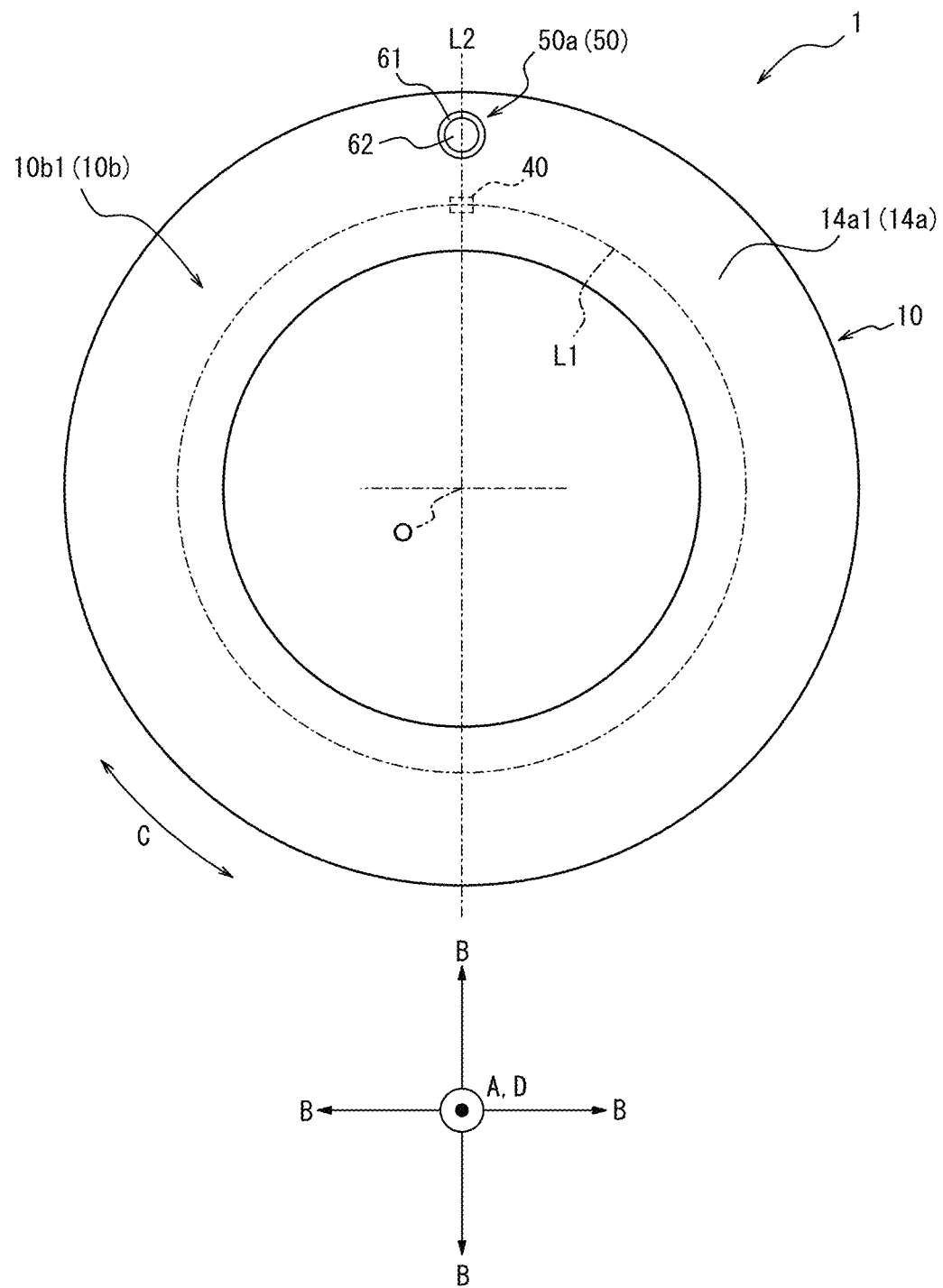
FIG. 4A is a diagram illustrating a variation of the first label area illustrated in FIG. 1.

The first label area 50a illustrated in FIG. 4A indicates the position of the communication device 40 in the tire circumferential direction C. However, the first label area 50a illustrated in FIG. 4A does not indicate the position of the communication device 40 in the tire radial direction B. In other words, the first label area 50a and the communication device 40 illustrated in FIG. 4A are disposed at the same position in the tire circumferential direction C, but are not disposed at the same position in the tire radial direction B. According to the first label area 50a illustrated in FIG. 4A, the position of the communication device 40 in the tire circumferential direction C can be identified.

Figure 4B:
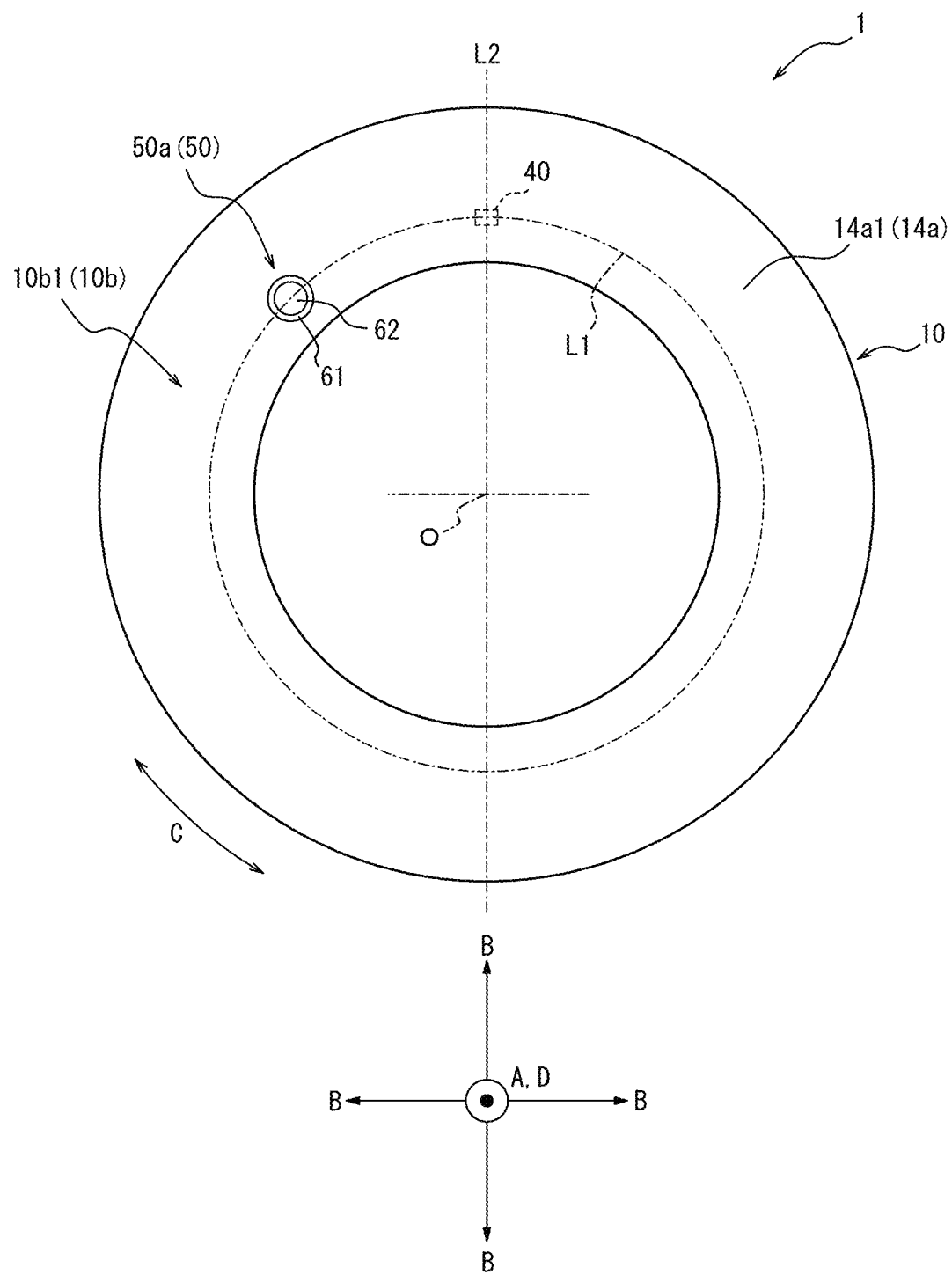
FIG. 4B is a diagram illustrating a variation of the first label area illustrated in FIG. 1.

The first label area 50a illustrated in FIG. 4B indicates the position of the communication device 40 in the tire radial direction B. However, the first label area 50a illustrated in FIG. 4B does not indicate the position of the communication device 40 in the tire circumferential direction C. In other words, the first label area 50a and the communication device 40 illustrated in FIG. 4B are disposed at the same position in the tire radial direction B, but are not disposed at the same position in the tire circumferential direction C. According to the first label area 50a illustrated in FIG. 4B, the position of the communication device 40 in the tire radial direction B can be identified.

Figure 4C:
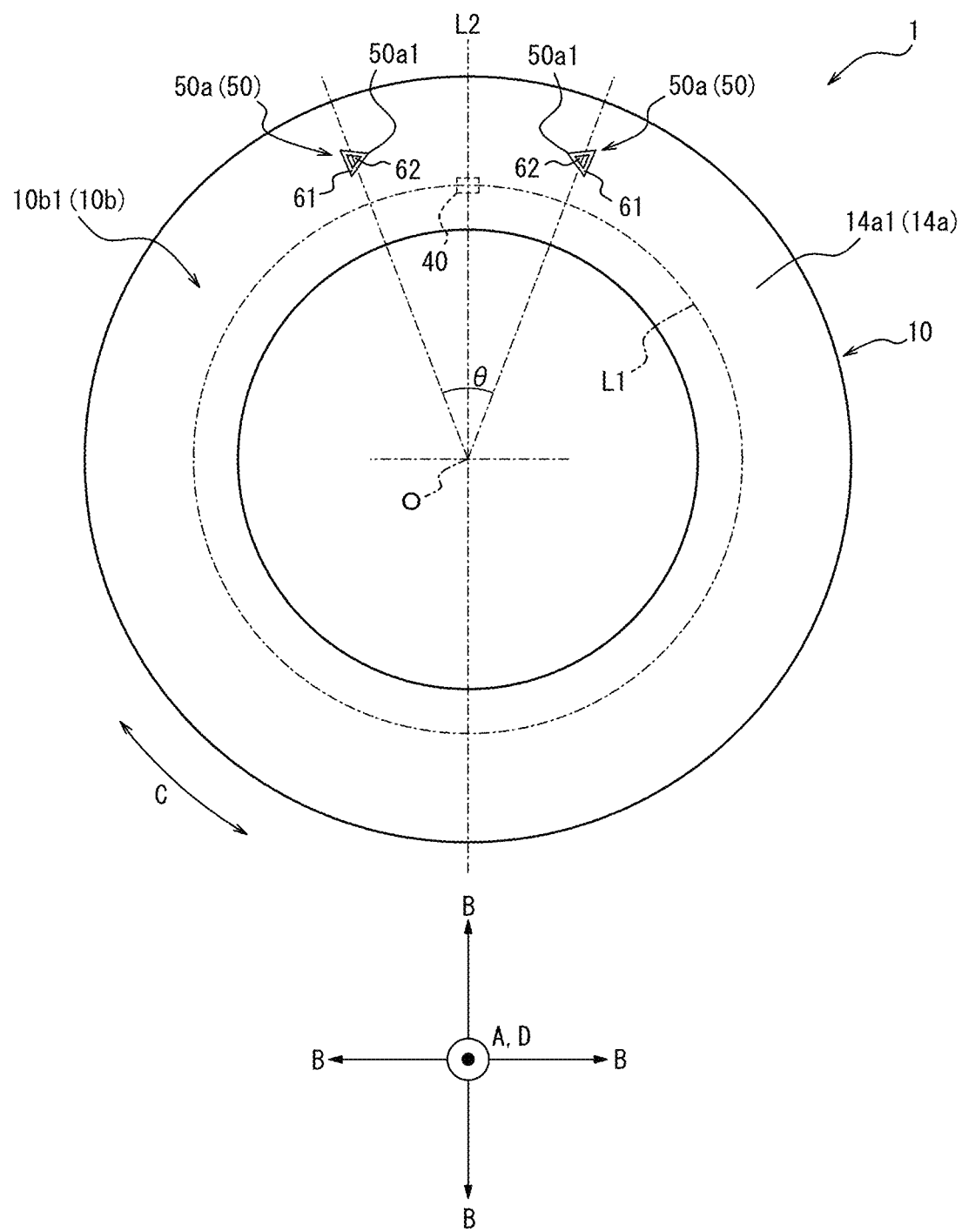
FIG. 4C is a diagram illustrating a variation of the first label area illustrated in FIG. 1.

The first label areas 50a illustrated in FIG. 4C indicate the position of the communication device 40 in the tire circumferential direction C. However, the first label areas 50a illustrated in FIG. 4C do not indicate the position of the communication device 40 in the tire radial direction B. More specifically, the first label areas 50a illustrated in FIG. 4C indicate a predetermined range in the tire circumferential direction C. The first label areas 50a illustrated in FIG. 4C indicate the range in the tire circumferential direction C, in which the central angle around the central axis O of the tire 1 is "θ". The communication device 40 is located within the range in the tire circumferential direction C indicated by the first label areas 50a. According to the first label areas 50a illustrated in FIG. 4C, the range in the tire circumferential direction C, in which the communication device 40 is located, can be identified.

In the example illustrated in FIG. 4C, two of the first label areas 50a disposed at different positions in the tire circumferential direction C indicate the range in the tire circumferential direction C, in which the communication device 40 is located. Each first label area 50*a* is approximately triangular in shape in the front view. The first label areas 50*a* are disposed such that a vertex 50*a*1 of one of the first label areas 50*a* faces a vertex 50*a*1 of the other first label area 50*a* in the tire circumferential direction C. Thus, when the two first label areas 50*a* indicate the range in the tire circumferential direction C, the respective first label areas 50*a* preferably include the vertices 50*a*1 facing each other in the tire circumferential direction C. The provision of such vertices 50*a*1 makes it easier to visually grasp the range in the tire circumferential direction C indicated by the two first label areas 50*a*. The external shape of each first label area 50*a* in the front view is not limited to the triangular shape illustrated in FIG. 4C. However, the triangular shape illustrated in FIG. 4C is preferable as the external shape of each first label area 50*a* in the front view. This makes it further easier to visually grasp the range in the tire circumferential direction C indicated by the two first label areas 50*a*.

Figure 4D:
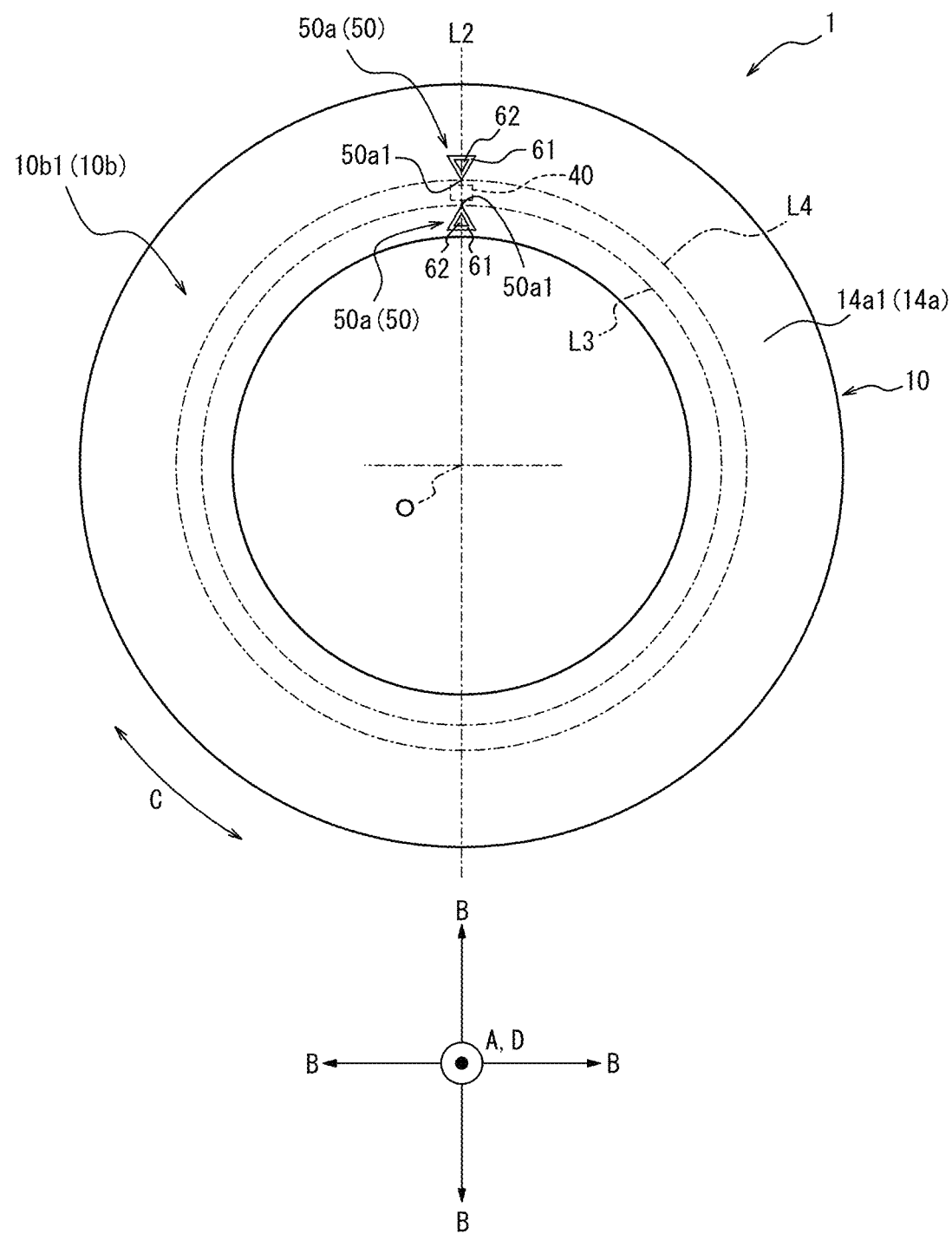
FIG. 4D is a diagram illustrating a variation of the first label area illustrated in FIG. 1.

The first label areas 50*a* illustrated in FIG. 4D indicate the position of the communication device 40 in the tire radial direction B and in the tire circumferential direction C. More specifically, the first label areas 50*a* illustrated in FIG. 4D are disposed at the same position as the communication device 40 in the tire circumferential direction C. The first label areas 50*a* illustrated in FIG. 4D also indicate a predetermined range in the tire radial direction B. The communication device 40 is located within the range in the tire radial direction B indicated by the first label areas 50*a*. According to the first label areas 50*a* illustrated in FIG. 4D, it is possible to identify the position of the communication device 40 in the tire circumferential direction C, as well as the range in the tire radial direction B in which the communication device 40 is located.

In the example illustrated in FIG. 4D, two of the first label areas 50*a* disposed at different positions in the tire radial direction B indicate the range in the tire radial direction B, in which the communication device 40 is located. Each first label area 50*a* is approximately triangular in shape in the front view. The first label areas 50*a* are disposed such that a vertex 50*a*1 of one of the first label areas 50*a* faces a vertex 50*a*1 of the other first label area 50*a* in the tire radial direction B. Thus, when the two first label areas 50*a* indicate the range in the tire radial direction B, the respective first label areas 50*a* preferably include the vertices 50*a*1 facing each other in the tire radial direction B. The provision of such vertices 50*a*1 makes it easier to visually grasp the range (the range between virtual circles L3 and L4 represented by long and short dashed lines in FIG. 4D) in the tire radial direction B indicated by the two first label areas 50*a*. The external shape of each first label area 50*a* in the front view is not limited to the triangular shape illustrated in FIG. 4D. However, the triangular shape illustrated in FIG. 4D is preferable as the external shape of each first label area 50*a* in the front view. This makes it further easier to visually grasp the range in the tire radial direction B indicated by the two first label areas 50*a*.

In FIG. 4D, the two first label areas 50*a* are disposed at the same position as the communication device 40 in the tire circumferential direction C, but may be disposed at different positions. However, as illustrated in FIG. 4D, the two first label areas 50*a* are preferably disposed at the same position as the communication device 40 in the tire circumferential direction C. This makes it possible to easily identify the position of the communication device 40 in the tire circumferential direction C, in addition to the position of the communication device 40 in the tire radial direction B.

Figure 4E:
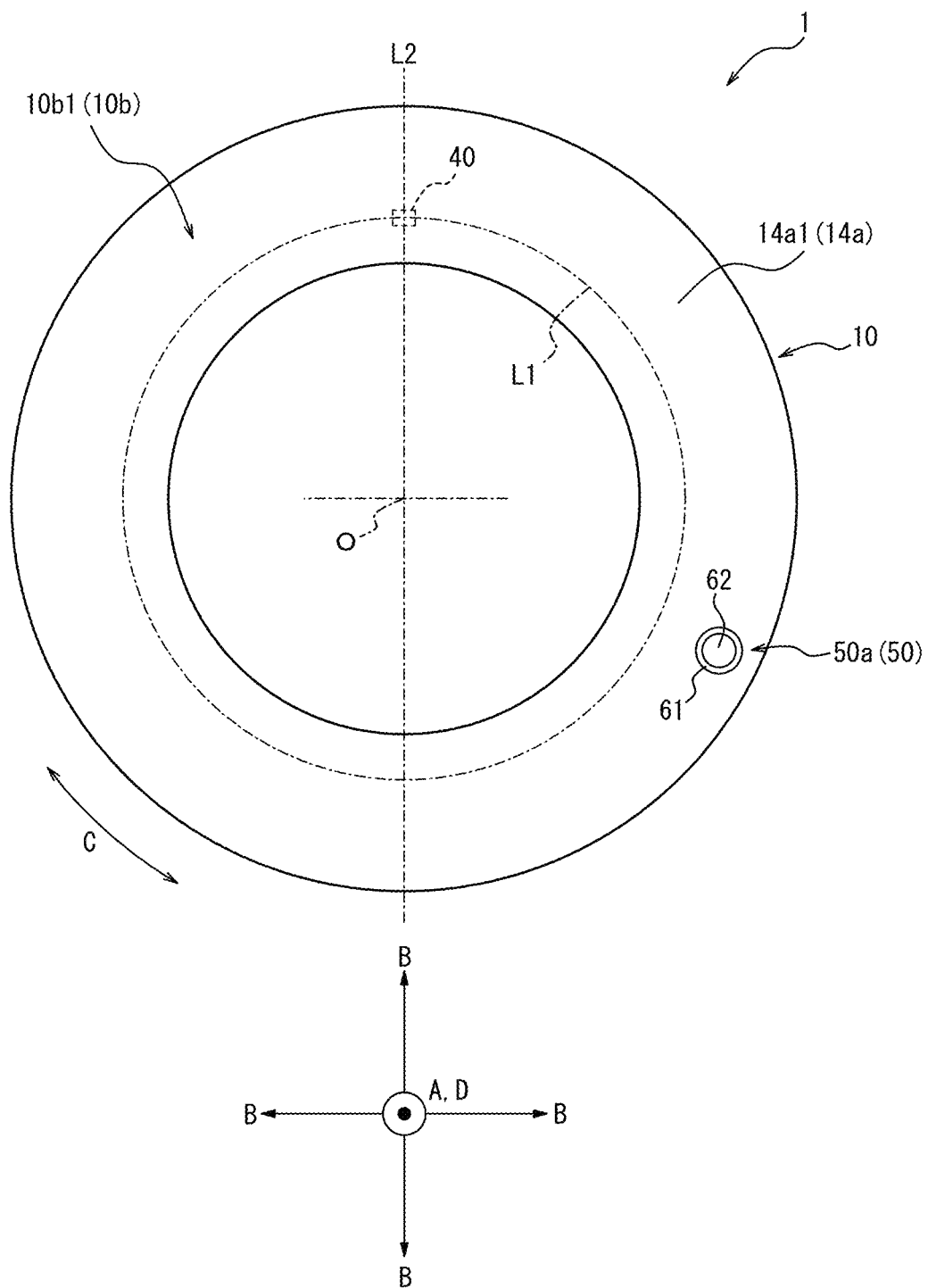
FIG. 4E is a diagram illustrating a variation of the first label area illustrated in FIG. 1.

The first label area 50*a* illustrated in FIG. 4E does not indicate the position of the communication device 40 in the tire radial direction B and the tire circumferential direction C, but only indicates that the communication device 40 is located in/on the first side portion 10*b*1. In other words, the first label area 50*a* illustrated in FIG. 4E may only indicate that the communication device 40 is located in/on the first side portion 10*b*1, among the first side portion 10*b*1 and the second side portion 10*b*2 (see FIG. 1). However, as illustrated in FIGS. 1 to 3 and FIGS. 4A to 4D, the first label area 50*a* preferably indicates the position of the communication device 40, which is provided in/on the first side portion 10*b*1, in at least one of the tire radial direction B or the tire circumferential direction C.

SECOND EMBODIMENT

Figure 5:
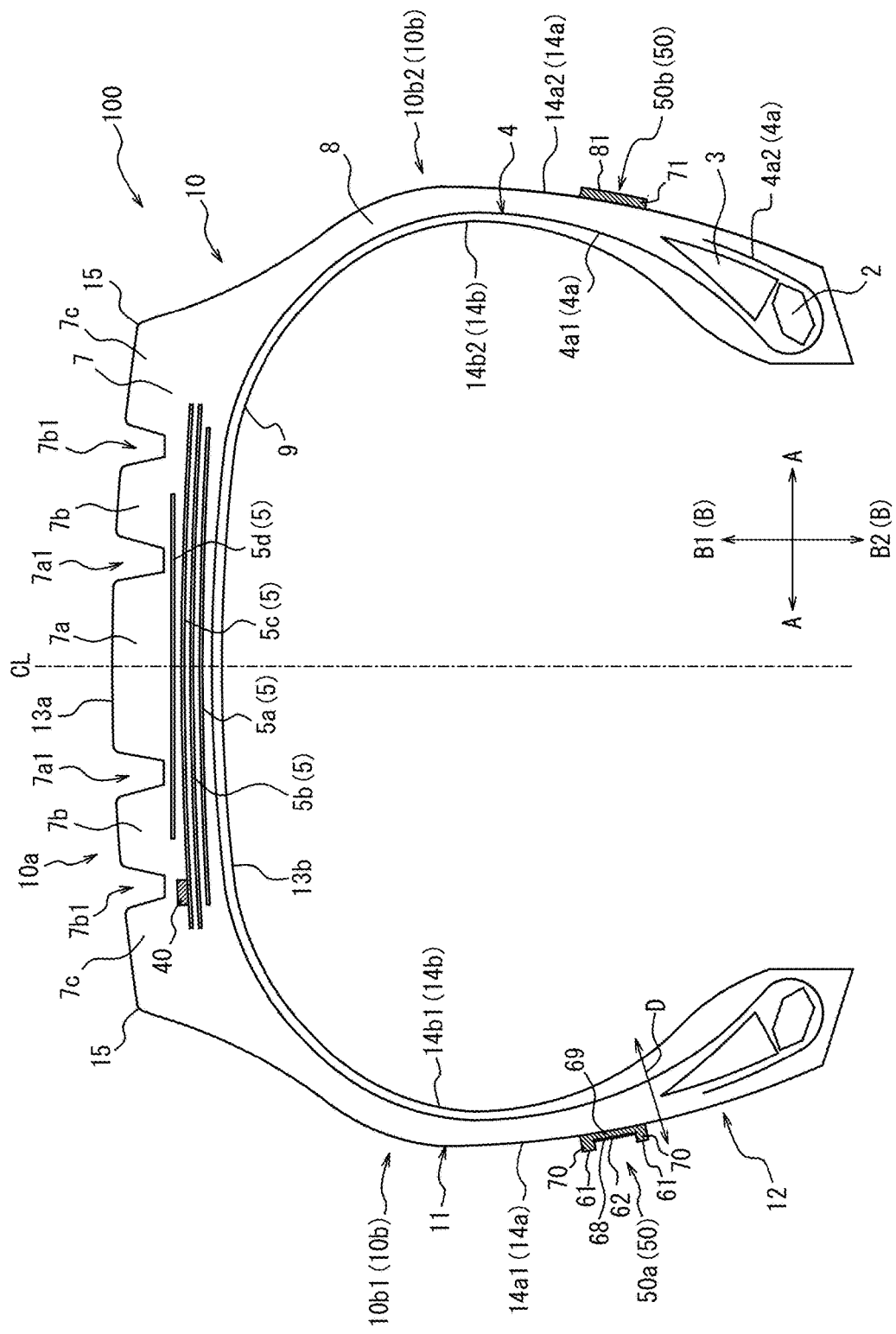
FIG. 5 is a cross-sectional view of a tire as an embodiment of the present disclosure in the tire width direction.

Next, with reference to FIG. 5, a pneumatic tire 100 (hereinafter simply referred to as "tire 100") as an embodiment of the tire according to the present disclosure will be exemplarily described. FIG. 5 is a cross-sectional view of the tire 100 in the tire width direction. The tire 100 of this embodiment differs from the tire 1 (see FIG. 1) described above only in the position of the communication device 40. Therefore, the position of the communication device 40 and information indicated by the first and second label areas 50*a* and 50*b* will be described here, and a description of the configuration common to the tire 1 of the first embodiment is omitted.

As illustrated in FIG. 5, the tire 100 includes the communication device 40 embedded in the tread portion 10*a* of the tire body 10. The communication device 40 of this embodiment is embedded within the tread portion 10*a*, but may be mounted on the tread inner surface 13*b*. As illustrated in FIG. 5, the communication device 40 is disposed on one side in the tire width direction A with respect to the tire equatorial plane CL. For convenience of explanation, one side in the tire width direction A with respect to the tire equatorial plane CL, on which the communication device 40 is disposed, is hereinafter simply referred to as "communication device 40 side in the tire width direction A". The other side in the tire width direction A with respect to the tire equatorial plane CL, on which the communication device 40 is not disposed, is simply referred to as "opposite side of the communication device 40 side in the tire width direction A".

The configuration of the first label area 50*a* of this embodiment is the same as that of the first embodiment described above, so a description is omitted here. However, in contrast to the first embodiment, the first label area 50*a* of this embodiment does not overlap with the communication device 40 in the tire wall thickness direction D. The first label area 50*a* of this embodiment indicates the communication device 40 side in the tire width direction A. In other words, due to the first label area 50*a*, it is possible to identify which side in the tire width direction A the communication device 40 is located with respect to the tire equatorial plane CL.

Furthermore, the first label area 50*a* of this embodiment is preferably disposed at the same position as the communication device 40 in the tire circumferential direction C. This makes it possible to identify, using the first label area 50*a*, the position of the communication device 40 in the tire circumferential direction C.

The configuration of the second label area 50*b* of this embodiment is the same as that of the first embodiment described above, so a description is omitted here. Also, as in the first embodiment, the second label area 50*b* of this embodiment indicates the opposite side of the communication device 40 side in the tire width direction A. In other words, due to the second label area 50*b*, it is possible to identify which side in the tire width direction A the communication device 40 is located with respect to the tire equatorial plane CL.

Furthermore, the second label area 50*b* of this embodiment is preferably disposed at the same position as the communication device 40 in the tire circumferential direction C. This makes it possible to identify, from the second label area 50*b*, the position of the communication device 40 in the tire circumferential direction C.

THIRD EMBODIMENT

Figure 6:
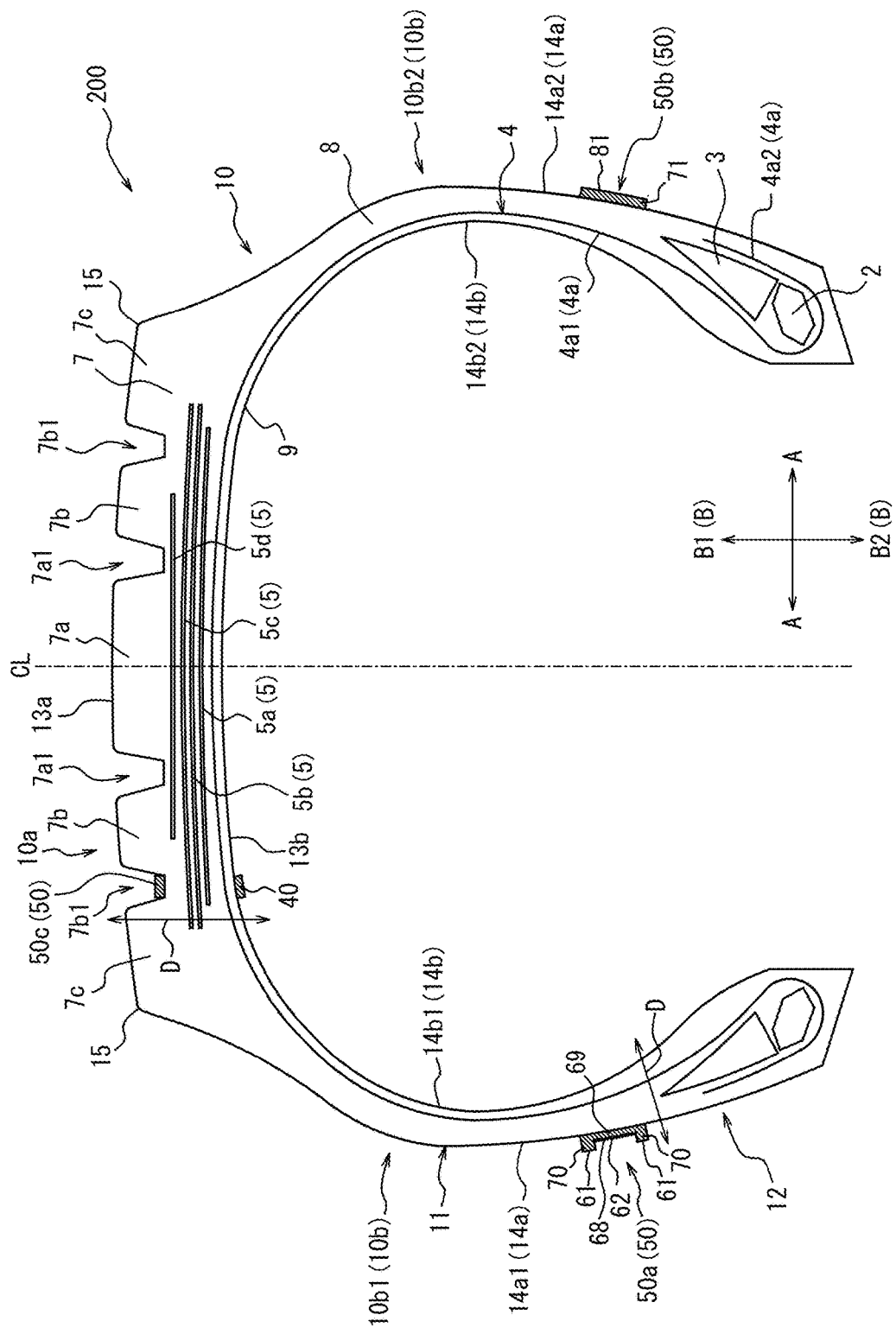
FIG. 6 is a cross-sectional view of a tire as an embodiment of the present disclosure in the tire width direction.

Next, with reference to FIGS. 6 and 7, a pneumatic tire 200 (hereinafter simply referred to as "tire 200") as an embodiment of the tire according to the present disclosure will be exemplarily described. FIG. 6 is a cross-sectional view of the tire 200 in the tire width direction. FIG. 7 is a part of a development diagram of the tread outer surface 13*a* of the tire 200. In FIG. 7, the position of the communication device 40 is represented by the dashed line. Compared to the tire 1 (see FIG. 1) and the tire 100 (see FIG. 5) described above, the tire 200 of this embodiment differs in its configuration in terms of the position of the communication device 40 and the provision of a third label area 50*c*. Therefore, the differences will be mainly described here, and a description of a configuration common to the tire 1 of the first embodiment and the tire 100 of the second embodiment is omitted.

As illustrated in FIG. 6, the tire 200 includes the communication device 40 mounted on the tread inner surface 13*b* of the tire body 10. As illustrated in FIG. 5, the communication device 40 of this embodiment is disposed on one side in the tire width direction A with respect to the tire equatorial plane CL. For convenience of explanation, one side in the tire width direction A with respect to the tire equatorial plane CL, on which the communication device 40 is disposed, is hereinafter simply referred to as "communication device 40 side in the tire width direction A". The other side in the tire width direction A with respect to the tire equatorial plane CL, on which the communication device 40 is not disposed, is simply referred to as "opposite side of the communication device 40 side in the tire width direction A".

The configuration of the first and second label areas 50*a* and 50*b* of this embodiment is the same as that of the first and second embodiments described above, so a description is omitted here. Information indicated by the first and second label areas 50*a* and 50*b* of this embodiment is also the same as that of the second embodiment described above, so a description is omitted here. However, the tire body 10 of the tire 200 of this embodiment may not include any one or both of the first label area 50*a* and the second label area 50*b*. The provision of the first label area 50*a* and the second label area 50*b* in the tire body 10 of the tire 200 allows the position of the communication device 40 to be identified more easily.

The third label area 50*c* is disposed on the tread outer surface 13*a*, which is an outer surface of the tread portion 10*a* of the tire body 10.

As illustrated in FIG. 7, in this embodiment, the third label area 50*c* and the communication device 40 are disposed at the same position in the tire width direction A. Here, "the third label area 50*c* and the communication device 40 are disposed at the same position in the tire width direction A" means that there is at least one virtual line L5 that is in parallel to the tire circumferential direction C and passes through the third label area 50*c* and the communication device 40 in the developed view (see FIG. 7) of the tread outer surface 13*a* of the tire 200. In other words, it is not limited to a case in which the extension areas of the respective third label area 50*c* and communication device 40 in the tire width direction A are completely coincident.

As illustrated in FIG. 7, in this embodiment, the third label area 50*c* and the communication device 40 are disposed at the same position in the tire circumferential direction C. Here, "the third label area 50*c* and the communication device 40 are disposed at the same position in the tire circumferential direction C" means that there is at least one virtual line L6 that is in parallel to the tire width direction A and passes through the third label area 50*c* and the communication device 40 in the developed view (see FIG. 7) of the tread outer surface 13*a* of the tire 200. In other words, it is not limited to a case in which the extension areas of the respective third label area 50*c* and communication device 40 in the tire circumferential direction C are completely coincident.

In other words, the third label area 50*c* and the communication device 40 of this embodiment overlap in the tire wall thickness direction D. The communication device 40 overlaps with the third label area 50*c* in the tire wall thickness direction D in its entire extension areas in the tire width direction A and in the tire circumferential direction C. In other words, the entire communication device 40 of this embodiment overlaps with the third label area 50*c* in the tire wall thickness direction D. However, only a part of the communication device 40 may overlap with the third label area 50*c* in the tire wall thickness direction D. The entire third label area 50*c* may overlap with the communication device 40 in the tire wall thickness direction D. Furthermore, the contour of the third label area 50*c* may coincide with the contour of the communication device 40 in the tire wall thickness direction D. In other words, the entire third label area 50*c* may overlap with the entire communication device 40 in the tire wall thickness direction D.

Thus, the third label area 50*c* of this embodiment is disposed in such a position that at least a part of the third label area 50*c* overlaps with the communication device 40 in the tire wall thickness direction D. Therefore, the position of the communication device 40 can be identified by identifying the third label area 50*c* from outside the tire 200.

As with the first label area 50*a* described above, the third label area 50*c* of this embodiment includes a light emission area 91. The details of the light emission area 91 are similar to those of the light emission area 61 of the first label area 50*a* described above, except that the outer shape of the third label area 50*c* is approximately rectangular in the front view (see FIG. 7), and that the third label area 50*c* is formed on a bottom surface of the outer circumferential groove 7*b*1, so a description is omitted here. For distinguishability in a bright environment, the light emission area 91 of the third label area 50*c* may be provided, for example, on a top surface of a convex portion provided on the bottom surface of the outer circumferential groove 7*b*1. The light emission area 91 of the third label area 50*c* may have, for example, a color that can be distinguished from the surroundings at the bottom surface of the outer circumferential groove 7*b*1.

As illustrated in FIG. 7, the third label area 50*c* of this embodiment preferably includes a non-light emission area 92 surrounded by the light emission area 91. The details of the non-light emission area 92 are similar to those of the non-light emission area 62 of the first label area 50*a* described above, except that the outer shape of the third label area 50*c* is approximately rectangular in the front view (see FIG. 7), and that the third label area 50c is formed on the bottom surface of the outer circumferential groove 7b1, so a description is omitted here.

Next, variations of the third label area 50c will be described with reference to FIGS. 8A to 8E. FIGS. 8A to 8E are each a part of a development diagram of the tread outer surface 13a of the tire 200. In FIGS. 8A to 8E, the position of the communication device 40 mounted on the tread inner surface 13b is represented by a dashed line.

The third label area 50c illustrated in FIG. 8A indicates the position of the communication device 40 in the tire width direction A. However, the third label area 50c illustrated in FIG. 8A does not indicate the position of the communication device 40 in the tire circumferential direction C. In other words, the third label area 50c and the communication device 40 illustrated in FIG. 8A are disposed at the same position in the tire width direction A, but are not disposed at the same position in the tire circumferential direction C. According to the third label area 50c illustrated in FIG. 8A, the position of the communication device 40 in the tire width direction A can be identified.

Figure 8B:
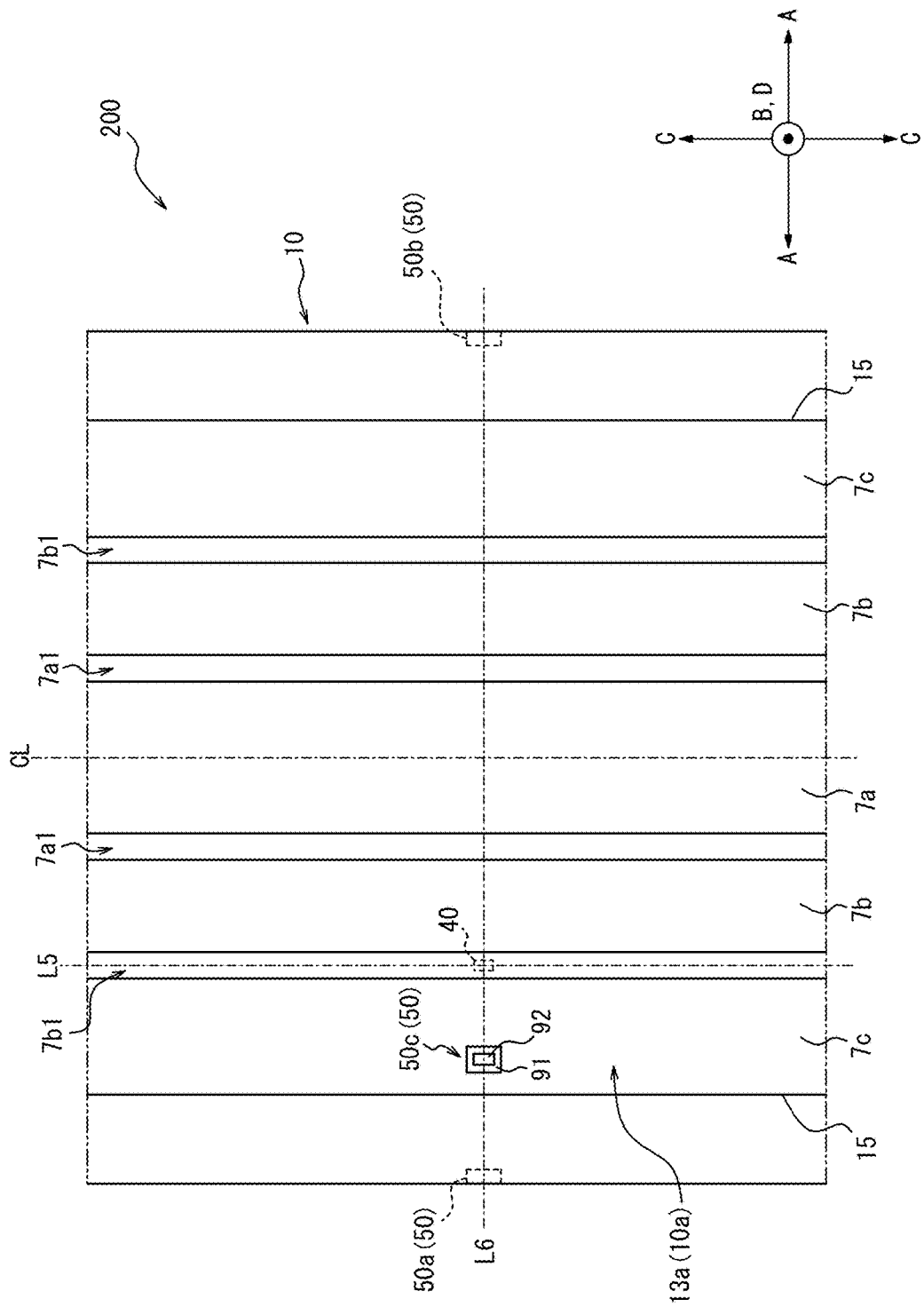
FIG. 8B is a diagram illustrating a variation of the third label area illustrated in FIG. 6.

The third label area 50c illustrated in FIG. 8B indicates the position of the communication device 40 in the tire circumferential direction C. However, the third label area 50c illustrated in FIG. 8B does not indicate the position of the communication device 40 in the tire width direction A. In other words, the third label area 50c and the communication device 40 illustrated in FIG. 8B are disposed at the same position in the tire circumferential direction C, but are not disposed at the same position in the tire width direction A. According to the third label area 50c illustrated in FIG. 8B, the position of the communication device 40 in the tire circumferential direction C can be identified.

Figure 8C:
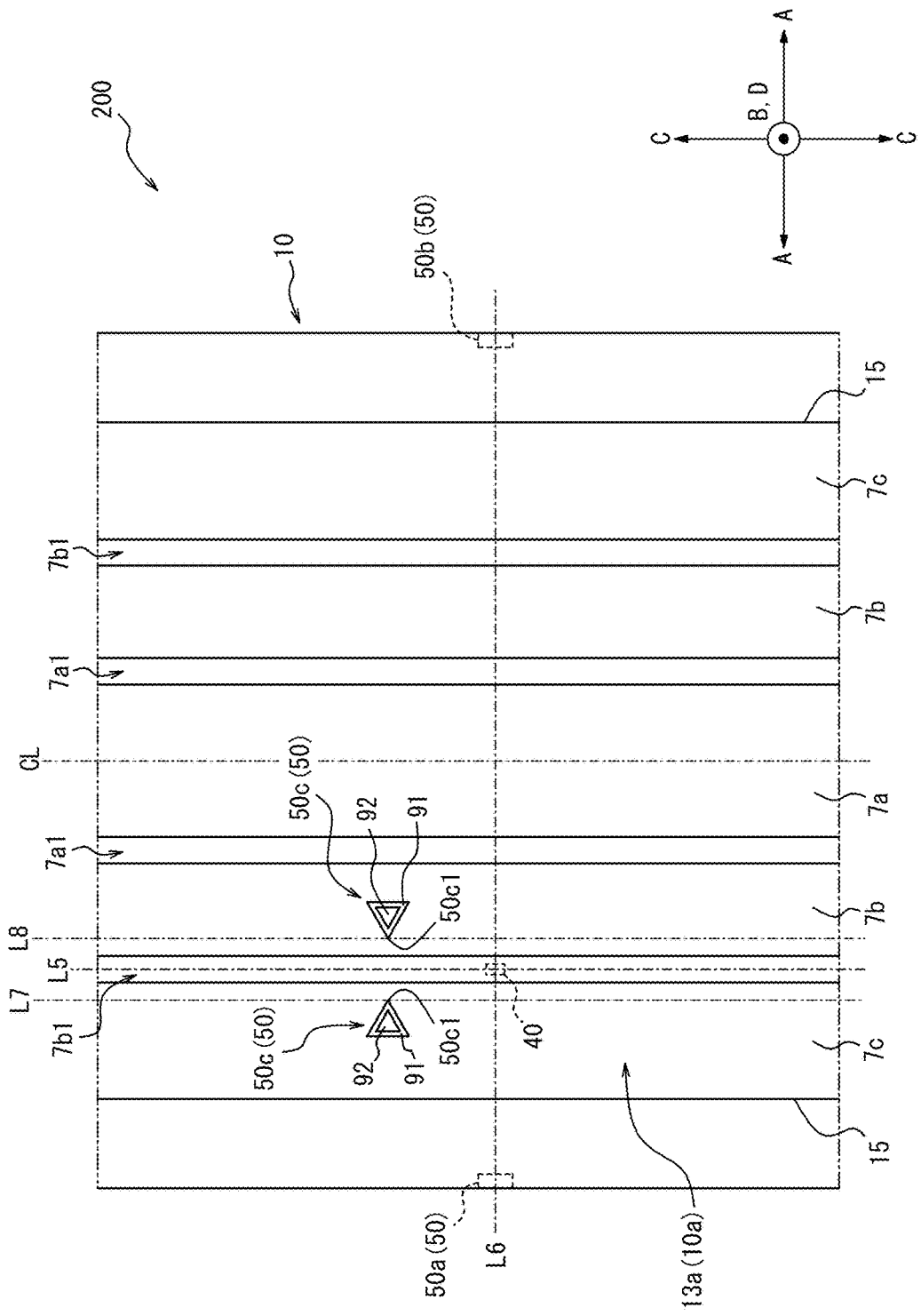
FIG. 8C is a diagram illustrating a variation of the third label area illustrated in FIG. 6.

The third label areas 50c illustrated in FIG. 8C indicate the position of the communication device 40 in the tire width direction A. However, the third label areas 50c illustrated in FIG. 8C do not indicate the position of the communication device 40 in the tire circumferential direction C. More specifically, the third label areas 50c illustrated in FIG. 8C indicate a predetermined range in the tire width direction A. The communication device 40 is located within the range in the tire width direction A indicated by the third label areas 50c. According to the third label areas 50c illustrated in FIG. 8C, the range in the tire width direction A, in which the communication device 40 is located, can be identified.

In the example illustrated in FIG. 8C, two of the third label areas 50c disposed at different positions in the tire width direction A indicate the range in the tire width direction A, in which the communication device 40 is located. Each third label area 50c is approximately triangular in shape in the front view (see FIG. 7). The third label areas 50c are disposed such that a vertex 50cl of one of the third label areas 50c faces a vertex 50cl of the other third label area 50c in the tire width direction A. Thus, when the two third label areas 50c indicate the range in the tire width direction A, the respective third label areas 50c preferably include the vertices 50cl facing each other in the tire width direction A. The provision of such vertices 50cl makes it easier to visually grasp the range in the tire width direction A indicated by the two third label areas 50c. The external shape of each third label area 50c in the front view is not limited to the triangular shape illustrated in FIG. 8C. However, the triangular shape illustrated in FIG. 8C is preferable as the external shape of each third label area 50c in the front view. This makes it further easier to visually grasp the range (the range between virtual straight lines L7 and L8 represented by long and short dashed lines in FIG. 8C) in the tire width direction A indicated by the two third label areas 50c.

The third label areas 50c illustrated in FIG. 8D indicate the position of the communication device 40 in the tire circumferential direction C. However, the third label areas 50c illustrated in FIG. 8D do not indicate the position of the communication device 40 in the tire width direction A. More specifically, the third label areas 50c illustrated in FIG. 8D indicate a predetermined range in the tire circumferential direction C. The communication device 40 is located within the range in the tire circumferential direction C indicated by the third label areas 50c. According to the third label areas 50c illustrated in FIG. 8D, the range in the tire circumferential direction C, in which the communication device 40 is located, can be identified.

In the example illustrated in FIG. 8D, the two third label areas 50c disposed at different positions in the tire circumferential direction C indicate the range in the tire circumferential direction C, in which the communication device 40 is located. Each third label area 50c is approximately triangular in shape in the front view (see FIG. 7). The third label areas 50c are disposed such that a vertex 50cl of one of the third label areas 50c faces a vertex 50cl of the other third label area 50c in the tire circumferential direction C. Thus, when the two third label areas 50c indicate the range in the tire circumferential direction C, the respective third label areas 50c preferably include the vertices 50cl facing each other in the tire circumferential direction C. The provision of such vertices 50cl makes it easier to visually grasp the range in the tire circumferential direction C indicated by the two third label areas 50c. The external shape of each third label area 50c in the front view is not limited to the triangular shape illustrated in FIG. 8D. However, the triangular shape illustrated in FIG. 8D is preferable as the external shape of each third label area 50c in the front view. This makes it further easier to visually grasp the range (the range between virtual straight lines L9 and L10 represented by long and short dashed lines in FIG. 8D) in the tire circumferential direction C indicated by the two third label areas 50c.

In FIG. 8D, the two third label areas 50c are disposed at different positions from the communication device 40 in the tire width direction A, but may be disposed at the same position. This makes it possible to easily identify the position of the communication device 40 in the tire width direction A, in addition to the position of the communication device 40 in the tire circumferential direction C.

The third label area 50c illustrated in FIG. 8E does not indicate the position of the communication device 40 in the tire width direction A and the tire circumferential direction C, but indicates the communication device 40 side of the tread portion 10a in the tire width direction A. In other words, the third label area 50c illustrated in FIG. 8E may indicate one side of the tread portion 10a in the tire width direction A, on which the communication device 40 is disposed, with respect to the tire equatorial plane CL. However, as illustrated in FIGS. 6, 7, and 8A to 8D, the third label area 50c preferably indicates the position of the communication device 40 provided in the tread portion 10a in at least one of the tire radial direction B or the tire circumferential direction C.

As described above, due to the light emission areas of the various label areas 50 described in the first to third embodiments and the variations thereof, the position of the communication device 40 can be easily identified even in a dark environment.

In particular, the light emission area of the label area 50 is preferably disposed at the same position as the communication device 40 in at least one of the tire width direction A, the tire radial direction B, or the tire circumferential direction C. This allows the position of the communication device 40 to be identified more easily in a dark environment based on the light emission area of the label area 50. In this specification, FIGS. 6, 7, and 8A illustrate the examples in which the light emission area 91 of the third label area 50c is disposed at the same position as the communication device 40 in the tire width direction A. In this specification, FIGS. 1 to 3 and 4B illustrate the examples in which the light emission area 61 of the first label area 50a and the light emission area 81 of the second label area 50b are disposed at the same position as the communication device 40 in the tire radial direction B. Furthermore, in this specification, the light emission area 61 of the first label area 50a and the light emission area 81 of the second label area 50b illustrated in FIGS. 1 to 3, 4A, 4D, 5, 6, 7, and 8A to 8E are disposed at the same position as the communication device 40 in the tire circumferential direction C. In this specification, the light emission area 91 of the third label area 50c illustrated in FIGS. 6, 7, and 8B is disposed at the same position as the communication device 40 in the tire circumferential direction C.

The tire according to the present disclosure is not limited to the specific configurations described in the above embodiments and variations, and various variations, modifications, and combinations are possible without departing from the scope of the claims.

INDUSTRIAL APPLICABILITY

The present disclosure relates to a tire.

REFERENCE SIGNS LIST 1, 100, 200 tire
2 bead core
3 bead filler
4 carcass
4a carcass ply
4a1 body part
4a2 folded part
5 belt
5a-5d first to fourth belts
7 tread rubber
7a center land area
7a1 inner circumferential groove
7b intermediate land area
7b1 outer circumferential groove
7c shoulder land area
8 side rubber
9 inner liner
10 tire body
10a tread portion
10b side portion
10b1 first side portion
10b2 second side portion
11 sidewall portion
12 bead portion
13a tread outer surface (example of outer surface of tire body)
13b tread inner surface (example of inner surface of tire body)
14a side outer surface (example of outer surface of tire body)
14a1 first side outer surface
14a2 second side outer surface
14b side inner surface (example of inner surface of tire body)
14b1 first side inner surface
14b2 second side inner surface
15 tread end
20a-20d first to fourth belt layers
40 communication device
50 label area
50a first label area
50a1 vertex
50b second label area
50c third label area
50c1 vertex
61 light emission area of first label area
62 non-light emission area of first label area
68 ridge
69 base protrusion portion
70 convex portion
71 convex portion
81 light emission area of second label area
91 light emission area of third label area
A tire width direction
B tire radial direction
B1 outer side in tire radial direction
B2 inner side in tire radial direction
C tire circumferential direction
D tire wall thickness direction
O central axis of tire
CL tire equatorial plane
L1, L3, L4 virtual circle
L2, L5-L10 virtual straight line

The invention claimed is:

1. A tire comprising:
a tire body including a side portion; and
a communication device embedded within the side portion of the tire body or mounted on an inner surface of the side portion of the tire body,
wherein
the tire body comprises a label area located on an outer surface of the side portion, the label area indicating a position of the communication device,
the tire body includes a cylindrical base protrusion portion which protrudes on the outer surface of the side portion, and an annular convex portion which protrudes from an outer edge of a top surface of the base protrusion portion, and
the label area comprises a light emission area which is provided on the top surface of the annular convex portion and a non-light emission area which is provided on the top surface of the base protrusion portion inside the annular convex portion.

2. The tire according to claim 1, wherein the light emission area of the label area has a color or shape that can be distinguished from surroundings.

3. The tire according to claim 2, wherein
the tire body comprises:
a tread portion; and
first and second side portions extending from both ends of the tread portion in a tire width direction toward an inner side in a tire radial direction,
wherein
the communication device is embedded within one of the tread portion, the first side portion, and the second side portion, or is attached to an inner surface of one of the tread portion, the first side portion, and the second side portion, and the light emission area of the label area is disposed at a same position as the communication device in at least any one direction of the tire width direction, the tire radial direction, or a tire circumferential direction.

4. The tire according to claim 1, wherein the tire body comprises:

a tread portion; and first and second side portions extending from both ends of the tread portion in a tire width direction toward an inner side in a tire radial direction, wherein the communication device is embedded within one of the tread portion, the first side portion, and the second side portion, or is attached to an inner surface of one of the tread portion, the first side portion, and the second side portion, and the light emission area of the label area is disposed at a same position as the communication device in at least any one direction of the tire width direction, the tire radial direction, or a tire circumferential direction.

5. The tire according to claim 1, wherein the communication device is disposed in such a position as not to overlap with the light emission area in a tire wall thickness direction, and is disposed in such a position as to overlap with the non-light emission area in the tire wall thickness direction.

6. The tire according to claim 1, wherein the non-light emission area is provided on a fine uneven surface, the fine uneven surface comprises a base surface and a plurality of ridges arranged in parallel on the base surface, the ridges having a height of 0.1 to 1.0 mm, and a distance between tops of two adjacent ridges of the plurality of ridges is 0.3 to 1.5 mm.

7. The tire according to claim 6, wherein the light emission area is formed by a resin phosphorescent material configuring a part of the outer surface of the tire body, the resin phosphorescent material carrying a phosphorescent material in void spaces of a foam resin, the non-light emission area has a different color from the light emission area, and the non-light emission area is formed of a resin coloring body that constitutes a part of the outer surface of the tire body, the resin coloring body carrying pigment in void spaces of a foam resin.

8. The tire according to claim 1, wherein the light emission area is formed by a resin phosphorescent material configuring a part of the outer surface of the tire body, the resin phosphorescent material carrying a phosphorescent material in void spaces of a foam resin, the non-light emission area has a different color from the light emission area, and the non-light emission area is formed of a resin coloring body that constitutes a part of the outer surface of the tire body, the resin coloring body carrying pigment in void spaces of a foam resin.

* * * * *